US011997549B2

(12) United States Patent
Awoniyi-Oteri et al.

(10) Patent No.: US 11,997,549 B2
(45) Date of Patent: *May 28, 2024

(54) BLIND DECODING LIMITS FOR DUAL ACTIVE PROTOCOL STACK (DAPS) HANDOVER

(71) Applicant: QUALCOMM Incorporated, San Diego, CA (US)

(72) Inventors: Olufunmilola Omolade Awoniyi-Oteri, San Diego, CA (US); Wanshi Chen, San Diego, CA (US); Huilin Xu, Temecula, CA (US); Hung Dinh Ly, San Diego, CA (US); Tao Luo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,389

(22) Filed: Mar. 7, 2022

(65) Prior Publication Data

US 2022/0272588 A1 Aug. 25, 2022

Related U.S. Application Data

(63) Continuation of application No. 17/065,216, filed on Oct. 7, 2020, now Pat. No. 11,272,405.
(Continued)

(51) Int. Cl.
*H04W 4/00* (2018.01)
*H04W 36/00* (2009.01)
*H04W 36/08* (2009.01)

(52) U.S. Cl.
CPC ....... *H04W 36/0083* (2013.01); *H04W 36/08* (2013.01)

(58) Field of Classification Search
CPC . H04W 36/0083; H04W 36/08; H04W 36/18; H04W 36/002; H04L 5/0053; H04L 1/0038; H04L 27/26025
(Continued)

(56) References Cited

U.S. PATENT DOCUMENTS 11,272,405 B2    3/2022  Awoniyi-Oteri
2016/0219557 A1  7/2016  He et al.
(Continued)

FOREIGN PATENT DOCUMENTS

CN    107959979 A    4/2018
EP    3742634 A1    11/2020
(Continued)

OTHER PUBLICATIONS

Intel Corporation: "Summary of Offline Discussion on Physical Layer Aspects of NR Mobility Enhancement," 3GPP Draft, 3GPP TSG RAN WG1 Meeting #98bis, R1-1911538, Intel NR E-Mobilty Offline Discussion Summary, 3rd Generation Partnership Project (3GPP), Mobile Competence Centre; 650, Route Des Lucioles; F-06921, Sophia-Antipolis Cedex; France, vol. RAN WG1, No. Chongqing, China; Aug. 14, 2019-Aug. 20, 2019, Oct. 22, 2019 (Oct. 22, 2019), XP051798802, 12 pages, Retrieved from the Internet: URL: https://ftp.3gpp.org/tsg_ran/WG1_RL1/TSGR1_98b/Docs/R1-1911538.zip [retrieved on Oct. 22, 2019] pp. 1, 3, 11, Section 2.5.
(Continued)

*Primary Examiner* — Marcos Batista
(74) *Attorney, Agent, or Firm* — Arun Swain

(57) ABSTRACT

This disclosure provides systems, methods and apparatus including computer programs encoded on computer storage media, for a user equipment (UE) to determine and apply limits to physical downlink control channel (PDCCH) processing in a dual active protocol stack handover scenario. In
(Continued)

one aspect, the UE utilizes a joint blind decode capability for both a source cell group and a target cell group to determine whether a total limit for PDCCH candidates to monitor or non-overlapped control channel elements (CCEs) to monitor is applicable. The UE may identify a per cell limit for each configured single transmit receive point (TRP) cell and each multiple TRP cell based on a sub-carrier spacing SCS of the cell and the determination. The UE may include an interface configured to obtain a PDCCH for a slot. The UE may perform blind decoding operations on CCEs up to the per cell monitoring limit for each cell.

30 Claims, 13 Drawing Sheets

Related U.S. Application Data

(60) Provisional application No. 62/933,145, filed on Nov. 8, 2019, provisional application No. 62/933,137, filed on Nov. 8, 2019.

(58) Field of Classification Search
USPC .......................................... 370/331; 455/312
See application file for complete search history.

(56) References Cited

U.S. PATENT DOCUMENTS

| | | |
|---|---|---|
| 2019/0223164 A1 | 7/2019 | He et al. |
| 2019/0357198 A1* | 11/2019 | Xiong ................. H04W 72/048 |
| 2021/0144599 A1 | 5/2021 | Awoniyi-Oteri et al. |
| 2021/0329647 A1 | 10/2021 | Park et al. |

FOREIGN PATENT DOCUMENTS

| | | |
|---|---|---|
| EP | 3742634 A1 | 11/2020 |
| WO | 2018144877 A1 | 8/2018 |
| WO | 2019143164 A1 | 7/2019 |
| WO | WO-2019143164 A1 | 7/2019 |

OTHER PUBLICATIONS

International Search Report and Written Opinion—PCT/US2020/054831—ISA/EPO—dated Mar. 22, 2021.
Intel Corporation: "Summary of Offline Discussion on Physical Layer Aspects of NR Mobility Enhancement," 3GPP Draft, 3GPP TSG RAN WG1 Meeting #98bis, R1-1911538, Intel NR E-Mobilty Offline Discussion Summary, 3rd Generation Partnership Project (3GPP), Mobile Competence Centre; 650, Route Des Lucioles; F-06921, Sophia-Antipolis Cedex; France, vol. RAN WG1, No. Chongqing, China; Aug. 14, 2019-Aug. 20, 2019, Oct. 22, 2019. (Oct. 22, 2019), 12 pages.
NEC: "Behaviours When Capability Coordination Is Not Performed", 3GPP TSG-RAN WG2 #107bis, R2-1913056, Chongqing, China, Oct. 14-18, 2019, 3 Pages.
ZTE: "Discussion on NR Mobility Enhancements in Physical Layer", 3GPP TSG RAN WG1 #98bis, R1-1910112, Chongqing, China, Oct. 14-20, 2019, 6 Pages.

* cited by examiner

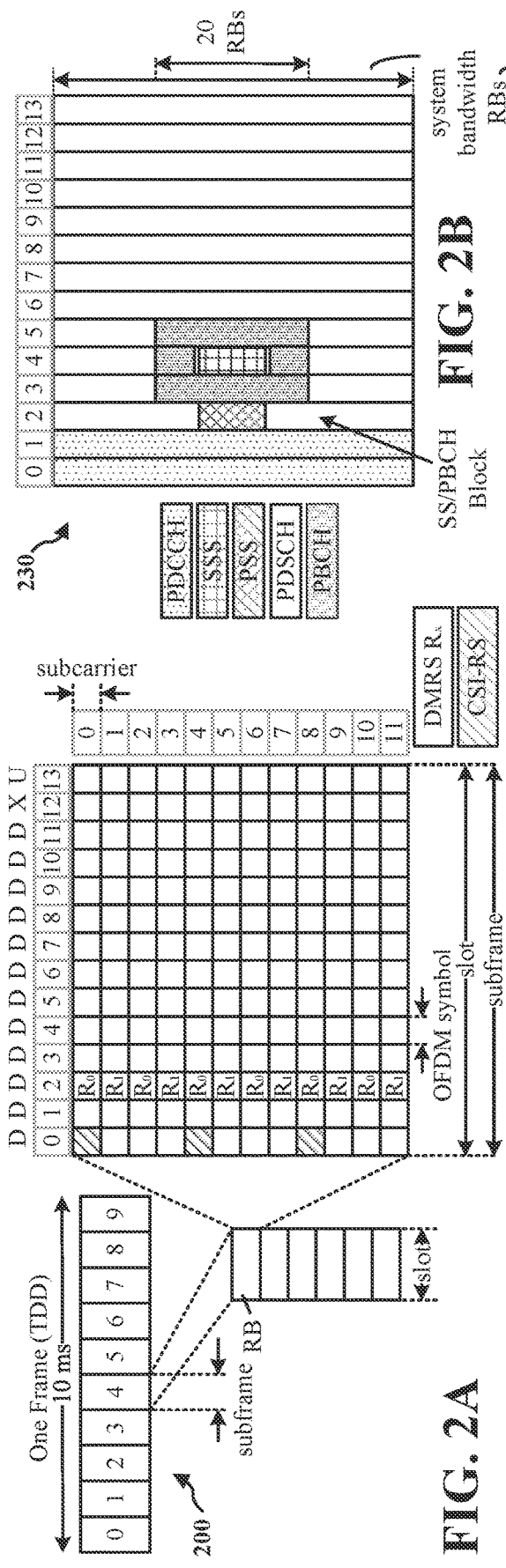
FIG. 2A  FIG. 2B
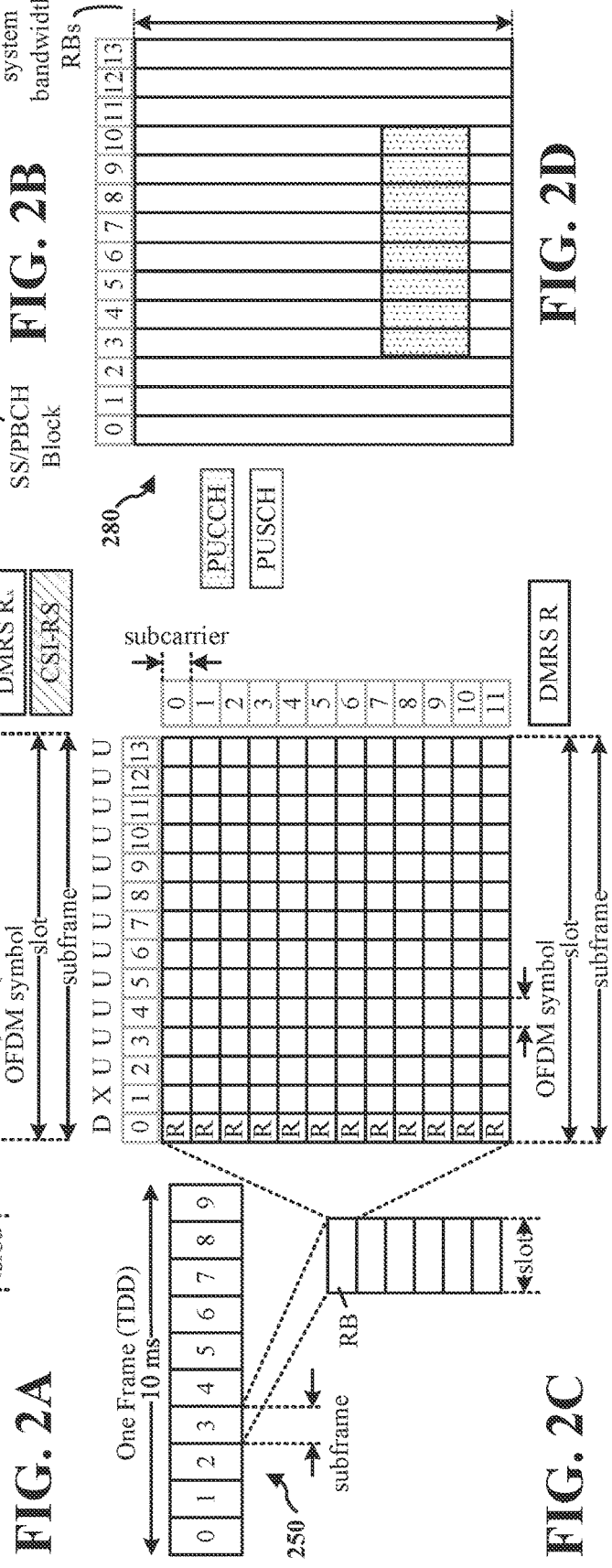
FIG. 2C  FIG. 2D

BLIND DECODING LIMITS FOR DUAL ACTIVE PROTOCOL STACK (DAPS) HANDOVER

CROSS REFERENCE TO RELATED APPLICATIONS

This application is a continuation of U.S. patent application Ser. No. 17/065,216 titled "BLIND DECODING LIMITS FOR DUAL ACTIVE PROTOCOL STACK (DAPS) HANDOVER," filed Oct. 7, 2020, which claims priority to U.S. Provisional Application No. 62/933,137 titled "BLIND DECODING LIMITS FOR DUAL ACTIVE PROTOCOL STACK HANDOVER," filed Nov. 8, 2019 and U.S. Provisional Application No. 62/933,145 titled "OVERBOOKING FOR DUAL ACTIVE PROTOCOL STACK HANDOVER," filed Nov. 8, 2019, all of which are assigned to the assignee hereof, and incorporated herein by reference in their entirety.

TECHNICAL FIELD

This disclosure relates to limitations on blind decoding in a handover scenario.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus for wireless communication including a processing system. The processing system is configured to determine whether a calculated total number of cells over all configured subcarrier spacings (SCSs) of a source cell group and a target cell group during a dual active protocol stack (DAPS) handover exceeds a joint blind decode capability. The processing system is configured to identify, based on the determination and a SCS of each cell, a per cell limit for physical downlink control channel (PDCCH) candidates to monitor, or non-overlapped control channel elements (CCEs) to monitor in a slot for each cell without control resource set (CORESET) grouping or with one CORESET group, and each cell with two CORESET groups if configured for the source cell group and the target cell group. The processing system is configured to perform blind decoding operations on PDCCH candidates and CCEs up to the per cell monitoring limit for each cell. The apparatus includes a first interface configured to obtain a PDCCH from at least one of the source cell group and the target cell group.

In some implementations, the calculated total number of cells for the source cell group and the target cell group for a given SCS, is a number of cells without CORESET grouping or with one CORESET group in the source cell group and in the target cell group with the same SCS plus a multiple factor for the source cell group times a number of cells with two CORESET groups in the source cell group with the same SCS plus a multiple factor for the target cell group times a number of cells with two CORESET groups in the target cell group with the same SCS.

In some implementations, the calculated total number of cells over all configured SCSs for the source cell group and the target cell group is less than or equal to the joint blind decode capability. The processing system is configured to identify the per cell limit by: determining the per cell limit for each cell without CORESET grouping or with one CORESET group with a given SCS as a value equal to a lookup value of a serving cell with the same SCS; and determining the per cell limit for each cell with two CORESET groups with a given SCS as a multiple factor for the respective cell group multiplied by a lookup value of a serving cell with same SCS.

In some implementations, the calculated total number of cells over all configured SCSs for the source cell group and the target cell group is greater than the joint blind decode capability. The processing system may be configured to identify the per cell limit by: determining a total monitoring limit for a given SCS as a function of the joint blind decode capability and a lookup value of a serving cell with the same SCS; determining the per cell limit for each cell without CORESET grouping or with one CORESET group with a given SCS as a minimum of the total monitoring limit for the given SCS and a lookup value of a serving cell with the same SCS; determining the per cell limit for each cell with two CORESET groups of the source cell group with a given SCS as a minimum of the total monitoring limit for the given SCS and a multiple factor for the source cell group multiplied the lookup value of a serving cell with the same SCS; and determining the per cell limit for each cell with two CORESET groups of the target cell group with a given SCS as a minimum of the total monitoring limit for the given SCS and a multiple factor for the target cell group multiplied by a lookup value of a serving cell with the same SCS.

Another innovative aspect of the subject matter described in this disclosure can be implemented in a method of wireless communication at an apparatus of a UE. The method may include determining whether a calculated total number of cells over all configured SCSs of a source cell group and a target cell group during a dual active protocol stack handover exceeds a joint blind decode capability. The method may include identifying, based on the determination and a SCS of each cell, a per cell limit for physical downlink control channel (PDCCH) candidates to monitor, or non-overlapped CCEs to monitor in a slot for each cell without CORESET grouping or with one CORESET group, and each cell with two CORESET groups if configured for the source cell group and the target cell group; and obtaining a PDCCH from at least one of the source cell group and the target cell group; and performing blind decoding operations on PDCCH candidates and CCEs up to the per cell monitoring limit for each cell. The method can include performing any of the innovative aspects performed by the apparatus.

Another innovative aspect of the subject matter described in this disclosure can be implemented in an apparatus for wireless communication. The apparatus includes means for determining whether a calculated total number of cells over all configured SCS of a source cell group and a target cell group during a dual active protocol stack handover exceeds a joint blind decode capability. The apparatus includes means for identifying, based on the determination and a SCS of each cell, a per cell limit for PDCCH candidates to monitor, or non-overlapped CCEs to monitor in a slot for each cell without CORESET grouping or with one CORESET group, and each cell with two CORESET groups if configured for the source cell group and the target cell group. The apparatus includes means for means for obtaining a PDCCH from at least one of the source cell group and the target cell group. The apparatus includes means for performing blind decoding operations on PDCCH candidates and CCEs up to the per cell monitoring limit for each cell. The apparatus can be configured to perform any of the innovative aspects performed by the processing system.

Another innovative aspect of the subject matter described in this disclosure can be implemented in a non-transitory computer-readable medium including stored instructions for wireless communication at an apparatus of a UE. The non-transitory computer-readable medium includes instructions to determine whether a calculated total number of cells over all configured SCSs of a source cell group and a target cell group during a dual active protocol stack handover exceeds a joint blind decode capability. The non-transitory computer-readable medium includes instructions to identify, based on the determination and a SCS of each cell, a per cell limit for PDCCH candidates to monitor, or non-overlapped CCEs to monitor in a slot for each cell without CORESET grouping or with one CORESET group, and each cell with two CORESET groups if configured for the source cell group and the target cell group. The non-transitory computer-readable medium includes instructions to obtain a PDCCH from at least one of the source cell group and the target cell group. The non-transitory computer-readable medium includes instructions to perform blind decoding operations on PDCCH candidates and CCEs up to the per cell monitoring limit for each cell. The non-transitory computer-readable medium can include instructions to perform any of the innovative aspects performed by the processing system.

Another innovative aspect of the subject matter described in this disclosure can be implemented in an apparatus for wireless communication including a processing system. The processing system is configured to determine whether a calculated number of cells over all configured SCSs of a source cell group during a dual active protocol stack handover exceeds a blind decode capability for the source cell group. The processing system is configured to identify, based on the first determination and a SCS of each cell in the source cell group, a per cell limit for PDCCH candidates to monitor, or non-overlapped CCEs to monitor in a slot for each cell without CORESET grouping or with one CORESET group, and each cell with two CORESET groups if configured for the source cell group. The processing system is configured to determine whether a calculated number of cells for a target cell group during the dual active protocol stack handover exceeds a blind decode capability for the target cell group. The processing system is configured to identify, based on the second determination and a SCS of each cell in the target cell group, a per cell limit for PDCCH candidates to monitor, or non-overlapped CCEs to monitor in a slot for cell without CORESET grouping or with one CORESET group, and each cell with two CORESET groups if configured for the target cell group. The processing system is configured to perform blind decoding operations on PDCCH candidates and CCEs up to the per cell monitoring limit for each cell. The apparatus includes a first interface configured to obtain a PDCCH from at least one of the source cell group and the target cell group.

In some implementations, the calculated number of cells for the source cell group cell group for a given SCS is a number of cells without CORESET grouping or with one CORESET group with the same SCS in the source cell group plus a multiple factor for the source cell group times a number of cells with two CORESET groups with the same SCS in the source cell group and the calculated number of cells for a given SCS for the target cell group is a number of cells without CORESET grouping or with one CORESET group with the same SCS in the target cell group plus a multiple factor for the target cell group times a number of cells with two CORESET groups with the same SCS in the target cell group.

In some implementations, the calculated number of cells over configured SCSs for the source cell group is less than or equal to blind decode capability for the source cell group. The processing system may be configured to determine the per cell limit for the source cell group by: determining the per cell limit for each cell without CORESET grouping or with one CORESET group with a given SCS as a value equal to a lookup value of a serving cell with the same SCS for the source cell group; and determining the per cell limit for each cell with two CORESET groups as a multiple factor for the source cell group multiplied by a value equal to the lookup value for a serving cell with same SCS for the source cell group.

In some implementations, the calculated number of cells over all configured SCSs in the source cell group is greater than the blind decode capability for the source cell group. The processing system may be configured to determine the per cell limit for the source cell group by: determining a source cell group monitoring limit for a given SCS as a function of the source blind decode capability and a lookup value of a serving cell with the same SCS for the source cell group; determining the per cell limit for each cell without CORESET grouping or with one CORESET group of the source cell group with a given SCS as a minimum of the source cell group monitoring limit for the given SCS and the lookup value of a serving cell with the same SCS; and determining the per cell limit for each cell with two CORESET groups of the source cell group with a given SCS as a minimum of the source cell group monitoring limit for the given SCS of the cell with two CORESET groups and a multiple factor for the source cell group multiplied the lookup value of a serving cell with the same SCS for the source group.

Another innovative aspect of the subject matter described in this disclosure can be implemented in a method of wireless communication at an apparatus of a UE. The method may include determining whether a calculated number of cells over all configured SCSs of a source cell group during a dual active protocol stack handover exceeds a blind decode capability for the source cell group. The method may include identifying, based on the first determination and a SCS of each cell in the source cell group, a per cell limit for PDCCH candidates to monitor, or non-overlapped CCEs to monitor in a slot for each cell without CORESET grouping or with one CORESET group, and each cell with two CORESET groups if configured for the source cell group. The method may include determining whether a calculated number of cells for a target cell group during the dual active protocol stack handover exceeds a blind decode capability for the target cell group. The method may include identifying, based on the second determination and a SCS of each cell in the target cell group, a per cell limit for PDCCH candidates to monitor, or non-overlapped CCEs to monitor in a slot for each cell without CORESET grouping or with one CORESET group, and each cell with two CORESET groups if configured for the target cell group. The method may include obtaining a PDCCH from at least one of the source cell group and the target cell group. The method may include performing blind decoding operations on PDCCH candidates and CCEs up to the per cell monitoring limit for each cell. The method can include performing any of the innovative aspects performed by the apparatus.

Another innovative aspect of the subject matter described in this disclosure can be implemented in an apparatus for wireless communication. The apparatus includes means for means for determining whether a calculated number of cells over all configured SCSs of a source cell group during a dual active protocol stack handover exceeds a blind decode capability for the source cell group. The apparatus includes means for identifying, based on the first determination and a SCS of each cell in the source cell group, a per cell limit for PDCCH candidates to monitor, or non-overlapped CCEs to monitor in a slot for each cell without CORESET grouping or with one CORESET group, and each cell with two CORESET groups if configured for the source cell group. The apparatus includes means for determining whether a calculated number of cells for a target cell group during the dual active protocol stack handover exceeds a blind decode capability for the target cell group. The apparatus includes means for identifying, based on the second determination and a SCS of each cell in the target cell group, a per cell limit for PDCCH candidates to monitor, or non-overlapped CCEs to monitor in a slot for each cell without CORESET grouping or with one CORESET group, and each cell with two CORESET groups if configured for the target cell group. The apparatus includes means for obtaining a PDCCH from at least one of the source cell group and the target cell group; and means for performing blind decoding operations on PDCCH candidates and CCEs up to the per cell monitoring limit for each cell. The apparatus can be configured to perform any of the innovative aspects performed by the processing system.

Another innovative aspect of the subject matter described in this disclosure can be implemented in a non-transitory computer-readable medium including stored instructions for wireless communication at an apparatus of a UE. The non-transitory computer-readable medium includes instructions to determine whether a calculated number of cells over all configured SCSs of a source cell group during a dual active protocol stack handover exceeds a blind decode capability for the source cell group. The non-transitory computer-readable medium includes instructions to identify, based on the first determination and a SCS of each cell in the source cell group, a per cell limit for PDCCH candidates to monitor, or non-overlapped CCEs to monitor in a slot for each cell without CORESET grouping or with one CORESET group, and each cell with two CORESET groups if configured for the source cell group. The non-transitory computer-readable medium includes instructions to determine whether a calculated number of cells for a target cell group during the dual active protocol stack handover exceeds a blind decode capability for the target cell group. The non-transitory computer-readable medium includes instructions to identify, based on the second determination and a SCS of each cell in the target cell group, a per cell limit for PDCCH candidates to monitor, or non-overlapped CCEs to monitor in a slot for each cell without CORESET grouping or with one CORESET group, and each cell with two CORESET groups if configured for the target cell group. The non-transitory computer-readable medium includes instructions to obtain a PDCCH from at least one of the source cell group and the target cell group; and perform blind decoding operations on PDCCH candidates and CCEs up to the per cell monitoring limit for each cell. The non-transitory computer-readable medium can include instructions to perform any of the innovative aspects performed by the processing system.

Another innovative aspect of the subject matter described in this disclosure can be implemented in an apparatus for wireless communication including a processing system. The processing system is configured to determine whether a calculated total number of cells over all configured SCSs of a source cell group and a target cell group during a dual active protocol stack handover exceeds a joint blind decode capability. The processing system is configured to identify, based on the determination and a SCS of each cell in the source cell group, a per cell limit for PDCCH candidates to monitor, or non-overlapped CCEs to monitor in a slot for each cell without CORESET grouping or with one CORESET group, and each multiple TRP cell if configured for the source cell group. The processing system is configured to identify, based on the determination and a SCS of each cell in the target cell group, a per cell limit for PDCCH candidates to monitor, or non-overlapped CCEs to monitor in a slot for each cell without CORESET grouping or with one CORESET group, and each cell with two CORESET groups for the target cell group. The processing system is configured to perform blind decoding operations on PDCCH candidates and CCEs up to the per cell monitoring limit for each cell. The apparatus includes a first interface configured to obtain a PDCCH from at least one of the source cell group and the target cell group.

In some implementations, the calculated total number of cells for the source cell group and the target cell group for a given SCS, is a number of cells without CORESET grouping or with one CORESET group in the source cell group and in the target cell group with the same SCS plus a multiple factor for the source cell group times a number of cells with two CORESET groups in the source cell group with the same SCS plus a multiple factor for the target cell group times a number of cells with two CORESET groups in the target cell group with the same SCS.

In some implementations, the calculated total number of cells over configured SCSs for the source cell group and target group is less than or equal to the joint blind decode capability. The processing system can be configured to identify the per cell limit for each cell by: determining the per cell limit for each cell without CORESET grouping or with one CORESET group with a given SCS in the source cell group as a lookup value of a serving cell with the same SCS for the source group; and determining the per cell limit for each cell with two CORESET groups in the source cell group as a multiple factor for the source cell group multiplied by a lookup value of a serving cell with the same SCS for the source group; determining the per cell limit for each cell without CORESET grouping or with one CORESET group with a given SCS in the target cell group as a lookup value of a serving cell with the same SCS for the target group; and determining the per cell limit for each cell with two CORESET groups in the target cell group as a multiple factor for the source cell group multiplied by a lookup value of a serving cell with the same SCS for the target group.

In some implementations, the calculated total number of cells over all configured SCSs for the source cell group and the target cell group is greater than the joint blind decode capability. The processing system can be configured to identify the per cell limit for each cell by: determining a source cell group total monitoring limit for a given SCS as a function of a source cell group blind decode capability and a lookup value of a serving cell with the same SCS for the source cell group; determining the per cell limit for each cell without CORESET grouping or with one CORESET group with a given SCS in the source cell group as a minimum of the source cell group total monitoring limit for the given SCS and a lookup value of a serving cell with the same SCS for the source cell group; determining the per cell limit for each cell with two CORESET groups with a given SCS in the source cell group as a minimum of the source cell group total monitoring limit for the given SCS and a multiple factor for the source cell group multiplied a lookup value of a serving cell for the source cell group; determining a target cell group total monitoring limit for a given SCS as a function of a target cell group blind decode capability and a lookup value of a serving cell with the same SCS for the target cell group; determining the per cell limit for each cell without CORESET grouping or with one CORESET group with a given SCS in the target cell group as a minimum of the target cell group total monitoring limit for the given SCS and a lookup value of a serving cell with the same SCS for the target cell group; and determining the per cell limit for each cell with two CORESET groups with a given SCS in the target cell group as a minimum of the target cell group total monitoring limit for the given SCS and a multiple factor for the target cell group multiplied a lookup value of a serving cell for the target cell group.

In some implementations, the processing system of any of the above apparatuses can be configured to perform blind decoding operations on CCEs of the PDCCH up to the per cell monitoring limit for an overbooked primary cell. The processing system can be configured to decode a priority search space set starting at a lowest search space set index, and exclude monitored PDCCH candidates and CCEs corresponding to the priority search space set from the per cell monitoring limit for the overbooked primary cell. The processing system can be configured to decode a secondary search space starting at a lowest search space set index, and exclude a number of monitored PDCCH candidates and CCEs used for the decoding of each index from the per cell monitoring limit for the overbooked primary cell. The processing system can be configured to stop the decoding when a number of configured monitored PDCCH candidates or CCEs for a next index is greater than a remaining number of PDCCH candidates or non-overlapped CCEs for the per cell monitoring limit of the overbooked primary cell.

Another innovative aspect of the subject matter described in this disclosure can be implemented in a method of wireless communication at an apparatus of a UE. The method may include determining whether a calculated total number of cells over all configured SCSs of a source cell group and a target cell group during a dual active protocol stack handover exceeds a joint blind decode capability. The method may include identifying, based on the determination and a SCS of each cell in the source cell group, a per cell limit for PDCCH candidates to monitor, or non-overlapped CCEs to monitor in a slot for each cell without CORESET grouping or with one CORESET group, and each cell with two CORESET groups if configured for the source cell group. The method may include identifying, based on the determination and a SCS of each cell in the target cell group, a per cell limit for PDCCH candidates to monitor, or non-overlapped CCEs to monitor in a slot for each cell without CORESET grouping or with one CORESET group, and each cell with two CORESET groups if configured for the target cell group. The method may include obtaining a PDCCH from at least one of the source cell group and the target cell group. The method may include performing blind decoding operations on PDCCH candidates and CCEs up to the per cell monitoring limit for each cell.

Another innovative aspect of the subject matter described in this disclosure can be implemented in an apparatus for wireless communication. The apparatus includes means for determining whether a calculated total number of cells over all configured SCSs of a source cell group and a target cell group during a dual active protocol stack handover exceeds a joint blind decode capability. The apparatus includes means for identifying, based on the determination and a SCS of each cell in the source cell group, a per cell limit for physical downlink control channel (PDCCH) candidates to monitor, or non-overlapped CCEs to monitor in a slot for each cell without CORESET grouping or with one CORESET group, and each cell with two CORESET groups if configured for the source cell group. The apparatus includes means for identifying, based on the determination and a SCS of each cell in the target cell group, a per cell limit for PDCCH candidates to monitor, or non-overlapped CCEs to monitor in a slot for each cell without CORESET grouping or with one CORESET group, and each cell with two CORESET groups if configured for the target cell group. The apparatus includes means for obtaining a PDCCH from at least one of the source cell group and the target cell group. The apparatus includes means for performing blind decoding operations on PDCCH candidates and CCEs up to the per cell monitoring limit for each cell. The apparatus can be configured to perform any of the innovative aspects performed by the processing system.

Another innovative aspect of the subject matter described in this disclosure can be implemented in a non-transitory computer-readable medium including stored instructions for wireless communication at an apparatus of a UE. The non-transitory computer-readable medium includes instructions to determine whether a calculated total number of cells over all configured SCSs of a source cell group and a target cell group during a dual active protocol stack handover exceeds a joint blind decode capability. The non-transitory computer-readable medium includes instructions to identify, based on the determination and a SCS of each cell in the source cell group, a per cell limit for PDCCH candidates to monitor, or non-overlapped control channel elements CEs to monitor in a slot for each cell without CORESET grouping or with one CORESET group, and each cell with two CORESET groups if configured for the source cell group.

The non-transitory computer-readable medium includes instructions to identify, based on the determination and a SCS of each cell in the target cell group, a per cell limit for PDCCH candidates to monitor, or non-overlapped CCEs to monitor in a slot for each cell without CORESET grouping or with one CORESET group, and each cell with two CORESET groups if configured for the target cell group. The non-transitory computer-readable medium includes instructions to obtain a PDCCH from at least one of the source cell group and the target cell group. The non-transitory computer-readable medium includes instructions to perform blind decoding operations on PDCCH candidates and CCEs up to the per cell monitoring limit for each cell. The non-transitory computer-readable medium can include instructions to perform any of the innovative aspects performed by the processing system.

Another innovative aspect of the subject matter described in this disclosure can be implemented in an apparatus for wireless communication including a processing system. The processing system is configured to determine a per cell limit for PDCCH candidates to monitor, or non-overlapped CCEs to monitor in a slot for a source primary cell of a source cell group for a dual access protocol stack handover to a target cell group. The processing system is configured to determine a per cell limit for PDCCH candidates to monitor or non-overlapped CCEs to monitor in a slot for a target primary cell of the target cell group. The processing system is configured to determine a number of PDCCH candidates and non-overlapped CCEs to monitor for a configured priority search space set for at least one overbooked primary cell of the source primary cell and the target primary cell. The processing system is configured to subtract the number of PDCCH candidates and non-overlapped CCEs to monitor for the priority search space from the respective per cell limit to determine a respective remaining number of PDCCH candidates, and non-overlapped CCEs to monitor for secondary search spaces. The processing system is configured to assign a secondary search space for the at least one overbooked primary cell starting at a lowest search space set index a respective number of assigned PDCCH candidates and non-overlapped CCEs. The processing system is configured to subtract the respective number of assigned PDCCH candidates and non-overlapped CCEs from the respective remaining number of PDCCH candidates and non-overlapped CCEs to monitor for the secondary search spaces. The processing system is configured to stop assigning PDCCH candidates and non-overlapped CCEs to secondary search spaces when the respective remaining number of PDCCH candidates and non-overlapped CCEs to monitor for the secondary search spaces is less than a number of PDCCH candidates and non-overlapped CCEs for a next search space index. The processing system is configured to perform blind decoding operations on the assigned PDDCH candidates and non-overlapping CCEs of the priority search space and of the secondary search spaces. The apparatus includes a first interface configured to obtain a PDCCH from the at least one overbooked primary cell.

In some implementations, the priority search space set can be a common search space set and the secondary search space set is a UE specific search space set.

In some implementations, the priority search space set can be a user equipment (UE) specific search space set and the secondary search space set is a common search space set. The processing system can be configured to determine the number of PDCCH candidates and non-overlapped CCEs to monitor for the configured priority search space set based on a limit for the UE specific search space set that is less than the respective per cell limit.

In some implementations, only the source primary cell is overbooked during the dual access protocol stack handover. In some implementations, only the target primary cell is overbooked during the dual access protocol stack handover. In some implementations, both the source primary cell and the target primary cell are overbooked during the dual-access-protocol stack handover. The priority search space for the source primary cell can be different than the priority search space of the target primary cell. The processing system can be configured to select one of the source primary cell and the target primary cell as a single overbooked primary cell based on a priority.

Another innovative aspect of the subject matter described in this disclosure can be implemented in a method of wireless communication at an apparatus of a UE. The method may include determining a per cell limit for physical downlink control channel (PDCCH) candidates to monitor, or non-overlapped control channel elements (CCEs) to monitor in a slot for a source primary cell of a source cell group for a dual access protocol stack handover to a target cell group. The method may include determining a per cell limit for PDCCH candidates to monitor or non-overlapped CCEs to monitor in a slot for a target primary cell of the target cell group. The method may include determining a number of PDCCH candidates and non-overlapped CCEs to monitor for a configured priority search space set for at least one overbooked primary cell of the source primary cell and the target primary cell. The method may include subtracting the number of PDCCH candidates and non-overlapped CCEs to monitor for the priority search space from the respective per cell limit to determine a respective remaining number of PDCCH candidates, and non-overlapped CCEs to monitor for secondary search spaces. The method may include assigning a secondary search space for the at least one overbooked primary cell starting at a lowest search space set index a respective number of assigned PDCCH candidates and non-overlapped CCEs. The method may include subtracting the respective number of assigned PDCCH candidates and non-overlapped CCEs from the respective remaining number of PDCCH candidates and non-overlapped CCEs to monitor for the secondary search spaces. The method may include stopping the assigning of PDCCH candidates and non-overlapped CCEs to secondary search spaces when the respective remaining number of PDCCH candidates and non-overlapped CCEs to monitor for the secondary search spaces is less than a number of PDCCH candidates and non-overlapped CCEs for a next search space index. The method may include obtaining a PDCCH from the at least one overbooked primary cell. The method may include performing blind decoding operations on the assigned PDDCH candidates and non-overlapping CCEs of the priority search space and of the secondary search spaces. The method can include performing any of the innovative aspects performed by the apparatus.

Another innovative aspect of the subject matter described in this disclosure can be implemented in an apparatus for wireless communication. The apparatus includes means for determining a per cell limit for PDCCH candidates to monitor, or non-overlapped CCEs to monitor in a slot for a source primary cell of a source cell group for a dual access protocol stack handover to a target cell group. The apparatus includes means for determining a per cell limit for PDCCH candidates to monitor or non-overlapped CCEs to monitor in a slot for a target primary cell of the target cell group. The apparatus includes means for determining a number of PDCCH candidates and non-overlapped CCEs to monitor for a configured priority search space set for at least one overbooked primary cell of the source primary cell and the target primary cell. The means for determining the number of PDCCH candidates and non-overlapped CCEs to monitor is configured to: subtract the number of PDCCH candidates and non-overlapped CCEs to monitor for the priority search space from the respective per cell limit to determine a respective remaining number of PDCCH candidates, and non-overlapped CCEs to monitor for secondary search spaces; assign a secondary search space for the at least one overbooked primary cell starting at a lowest search space set index a respective number of assigned PDCCH candidates and non-overlapped CCEs; subtract the respective number of assigned PDCCH candidates and non-overlapped CCEs from the respective remaining number of PDCCH candidates and non-overlapped CCEs to monitor for the secondary search spaces; and stop the assigning of PDCCH candidates and non-overlapped CCEs to secondary search spaces when the respective remaining number of PDCCH candidates and non-overlapped CCEs to monitor for the secondary search spaces is less than a number of PDCCH candidates and non-overlapped CCEs for a next search space index. The apparatus includes means for obtaining a PDCCH from the at least one overbooked primary cell. The apparatus includes means for performing blind decoding operations on the assigned PDDCH candidates and non-overlapping CCEs of the priority search space and of the secondary search spaces, The apparatus can be configured to perform any of the innovative aspects performed by the processing system.

Another innovative aspect of the subject matter described in this disclosure can be implemented in a non-transitory computer-readable medium including stored instructions for wireless communication at an apparatus of a UE. The non-transitory computer-readable medium includes instructions to determine a per cell limit for physical downlink control channel (PDCCH) candidates to monitor, or non-overlapped control channel elements (CCEs) to monitor in a slot for a source primary cell of a source cell group for a dual access protocol stack handover to a target cell group. The non-transitory computer-readable medium includes instructions to determine a per cell limit for PDCCH candidates to monitor or non-overlapped CCEs to monitor in a slot for a target primary cell of the target cell group. The non-transitory computer-readable medium includes instructions to determine a number of PDCCH candidates and non-overlapped CCEs to monitor for a configured priority search space set for at least one overbooked primary cell of the source primary cell and the target primary cell. The non-transitory computer-readable medium includes instructions to subtract the number of PDCCH candidates and non-overlapped CCEs to monitor for the priority search space from the respective per cell limit. The non-transitory computer-readable medium includes instructions to determine a respective remaining number of PDCCH candidates, and non-overlapped CCEs to monitor for secondary search spaces. The non-transitory computer-readable medium includes instructions to assign a secondary search space for the at least one overbooked primary cell starting at a lowest search space set index a respective number of assigned PDCCH candidates and non-overlapped CCEs. The non-transitory computer-readable medium includes instructions to subtract the respective number of assigned PDCCH candidates and non-overlapped CCEs from the respective remaining number of PDCCH candidates and non-overlapped CCEs to monitor for the secondary search spaces. The non-transitory computer-readable medium includes instructions to stop the assigning of PDCCH candidates and non-overlapped CCEs to secondary search spaces when the respective remaining number of PDCCH candidates and non-overlapped CCEs to monitor for the secondary search spaces is less than a number of PDCCH candidates and non-overlapped CCEs for a next search space index. The non-transitory computer-readable medium includes instructions to obtain a PDCCH from the at least one overbooked primary cell. The non-transitory computer-readable medium includes instructions to perform blind decoding operations on the assigned PDDCH candidates and non-overlapping CCEs of the priority search space and of the secondary search spaces. The non-transitory computer-readable medium can include instructions to perform any of the innovative aspects performed by the processing system.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows a diagram of an example of a first 5G NR frame.

FIG. 2B shows a diagram of an example of DL channels within a 5G NR subframe.

FIG. 2C shows a diagram of an example of a second 5G NR frame.

FIG. 2D shows a diagram of an example of a UL channels within a 5G NR subframe.

DETAILED DESCRIPTION

Figure 1:
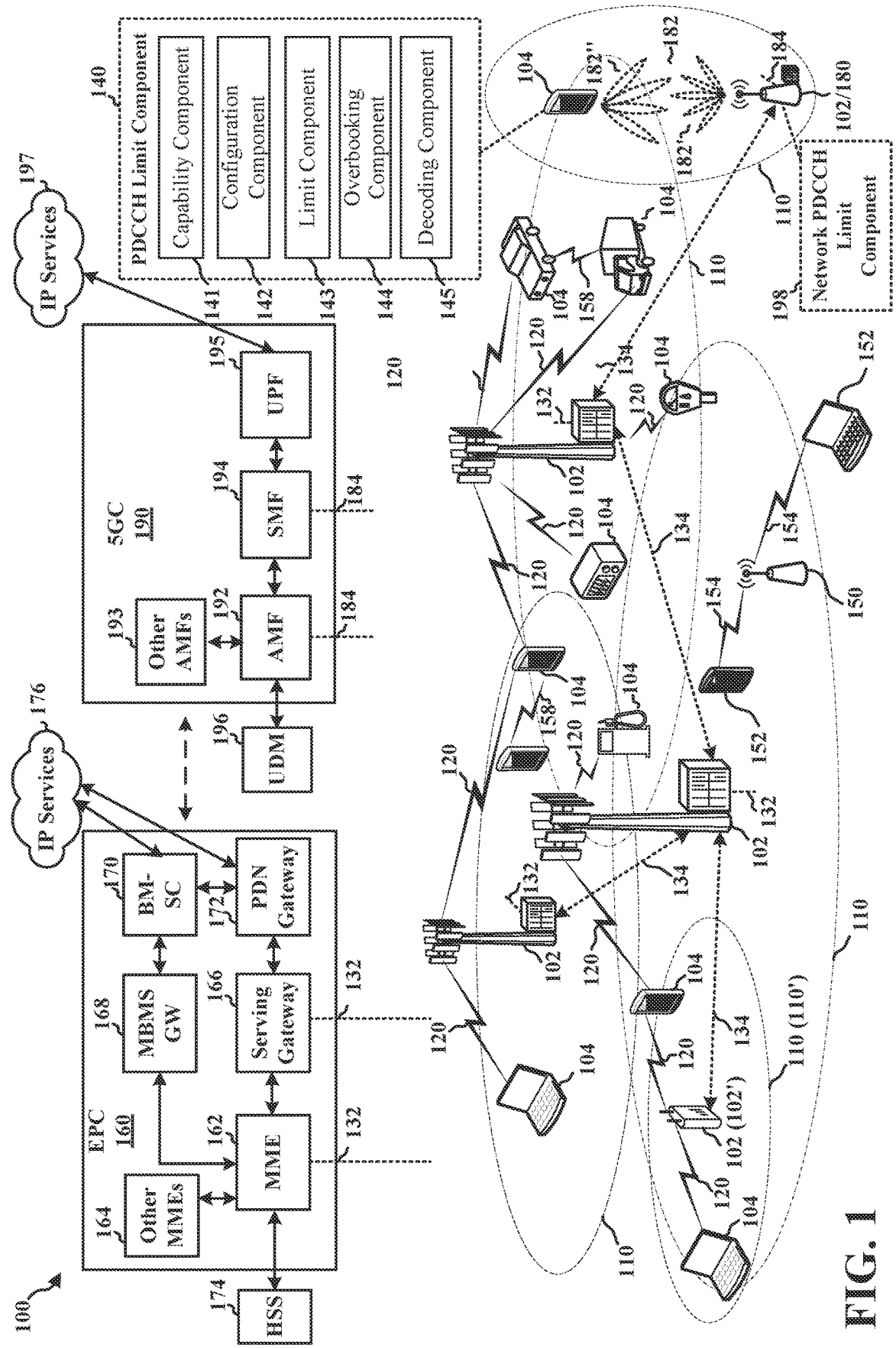
FIG. 1 shows a diagram of an example of a wireless communications system and an access network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth© standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. The processor may include at least one interface or be coupled to at least one an interface that can obtain or output signals. The processor may obtain signals via the interface and output signals via the interface. In some implementations, the interface may be a printed circuit board (PCB) transmission line. In some other implementations, the interface may include a wireless transmitter, a wireless transceiver, or a combination thereof. For example, the interface may include a radio frequency (RF) transceiver which can be implemented to receive or transmit signals, or both. One or more processors in the processing system may execute software that may be stored in a computer memory, or in a computer-readable medium. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The present disclosure provides for determining and applying limits to physical downlink control channel (PDCCH) processing in a dual active protocol stack (DAPS) handover scenario. In the DAPS handover scenario, a user equipment (UE) is concurrently connected to both a source cell group (such as a base station) including a source primary cell and a target cell group (such as a base station) including a target primary cell. Cells within both the source cell group and the target cell group may transmit PDCCHs that schedule the UE to receive a physical downlink shared channel (PDSCH). Since the UE decodes the PDCCH before being able to receive the PDSCH, PDCCH decoding resources may be limited. In particular, in the DAPS handover scenario the PDCCH decoding resources may be divided between PDCCHs received from the source cell group and PDCCHs received from the target cell group.

An access network may utilize multiple transmit-receive points (TRPs) for a single cell. In some deployments, a separate downlink control information (DCI) may be used to schedule a downlink transmission from each TRP. For example, in the case of two TRPs, a first DCI transmitted from a first TRP may schedule a first physical downlink shared channel (PDSCH) transmitted from the first TRP, and a second DCI transmitted from the second TRP may schedule a second PDSCH transmitted from the second TRP. The use of multiple TRPs may be defined for a specific serving cell such that one or more cells may be configured with multiple TRPs while other serving cells may be configured with single TRP. The multiple TRPs may operate in the same active bandwidth part (BWP) with the same sub-carrier spacing (SCS). In order to determine the PDSCH transmissions, a UE may monitor a set of PDCCH candidates in one or more control resource sets (CORESETs). Each CORESET may include multiple control channel elements (CCE) defining a search space set. A non-overlapped CCE may refer to a unique CCE that does not use the same time and frequency domain resources as another CCE. The search space may include a common search space (CSS) and a UE-specific search space (USS). The monitoring of the set of PDCCH candidates in one or more CORESETs may be referred to as blind decoding as the UE may not know which DCI format is being received and may decode each PDCCH candidate according to the monitored DCI formats. Additionally, higher layer signaling may indicate an index per CORESET, which may group the CORESETS based on TRP. A serving cell configured with two CORESETS may be referred to as a multiple TRP cell or multi-TRP cell. A serving cell configured without CORESET grouping or with one CORESET group may be referred to as a single TRP cell.

In some implementations, a UE utilizes a joint blind decode capability for both the source cell group and the target cell group to determine whether a total limit for PDCCH candidates to monitor or non-overlapped CCEs to monitor is applicable. The UE may identify a per cell limit for each configured single TRP cell and each multiple TRP cell based on the SCS of the cell and the determination of whether the total limit for PDCCH monitoring is applicable. The UE may include an interface configured to obtain the one or more PDCCHs for a slot from at least one of the source cell group and the target cell group. The UE may perform blind decoding operations on CCEs up to the per cell monitoring limit for each cell.

In some other implementations, a UE utilizes separate thresholds of a number of serving cells for the source cell group and a number of serving cells for the target cell group to separately determine for the source cell group and the target cell group whether a group limit for PDCCH candidates to monitor or non-overlapped control channel elements (CCEs) is applicable based on a number of cells in each of the source cell group and the target cell group. The UE may identify a per cell limit, based on an SCS of the of each cell, and the respective determination of whether the group limit is applicable. The UE may include an interface configured to obtain the one or more PDCCHs for a slot from at least one of the source cell group and the target cell group. The UE may perform blind decoding operations for PDCCH candidates on CCEs up to the per cell monitoring limit for each cell.

The present disclosure also provides a UE to allocate the per cell monitoring limit of PDCCH candidates to monitor or non-overlapped CCEs to search spaces of the source primary cell and the target primary cell in an overbooking scenario. In the overbooking scenario, one or both of the source primary cell and the target primary cell are configured with a number of search spaces that exceeds the per cell monitoring limit. The UE may assign a number of PDCCH candidates to monitor and non-overlapped CCEs to a priority search space set of at least one overbooked cell of the source primary cell or the target primary cell. The UE may assign a remaining number of PDCCH candidates to monitor and non-overlapped CCEs for each primary cell to a secondary search space set starting with a lowest search space set index and stopping when the number of PDCCH candidates to monitor or non-overlapped CCEs for the next search space exceeds the remaining number. The UE may include an interface configured to obtain the one or more PDCCHs for a slot from at least one of the source primary and the target primary cell. The UE may perform blind decoding operations on the assigned PDCCH candidates and non-overlapping CCEs.

Particular implementations of the subject matter described in this disclosure can be implemented to realize one or more of the following potential advantages. A UE may allocate PDCCH processing resources among both the source cell group and the target cell group to facilitate concurrent communication during a handover. This concurrent connection allows for a make-before-break handover that may reduce latency or dropped packets. The UE also may perform overbooking on a priority target cell for a priority search space allowing the UE to receive information during the handover.

FIG. 1 shows a diagram of an example of a wireless communications system and an access network. Limits for blind decoding of a search space are implemented in the access network. The wireless communications system (also referred to as a wireless wide area network (WWAN)) includes base stations 102, UEs 104, an Evolved Packet Core (EPC) 160, and another core network (such as a 5G Core (5GC) 190). The base stations 102 may include macrocells (high power cellular base station) or small cells (low power cellular base station). The macrocells include base stations. The small cells include femtocells, picocells, and microcells.

In some implementations, one or more of the UEs 104 may include a PDCCH limit component 140 for determining and applying one or both of a limit on a number of PDCCH candidates and a limit on a number of non-overlapped CCEs to be used for blind decoding of a search space. The PDCCH limit component 140 may apply the limits in the case of overbooking where the UE 104 may be configured with search spaces that exceed the limits. The PDCCH limit component 140 may include a capability component 141 that signals zero or more UE capabilities related to PDCCH reception, a configuration component 142 that receives a cell configuration for the access network 100 including one or more serving cells (such as base stations 102), a limit component 143 that determines a per cell limit on the number of PDCCH candidates and the number of non-overlapped CCEs based on the capabilities of the UE, an overbooking component 144 that assigns PDCCH candidates and CCEs to a priority search space set and a secondary search space set of an overbooked primary cell, and a decoding component 145 that performs blind decoding operations for PDCCH candidates on the CCEs up to the limits.

In some implementations, the PDCCH limit component 140 may define limits based on a number of serving cells, but may increase a weight for multiple TRP cells using a multiple factor capability (R) or a configured multiple factor (r). The value of R and r may be between 1 and 2 inclusive for configurations with up to two TRPs in a given serving cell corresponding to two CORESET groups. For more than two TRPs/CORESET groups the conditions may be different (such as the value of R or r may be greater than 2). The capability component 141 may determine a blind decode capability (Ncap), which may be a joint blind decode capability across the source cell group and the target cell group or a group blind decode capability for one of the source cell group or the target cell group. The configuration component 142 may receive a configuration of serving cells indicating a number (a) of configured downlink serving cells with a single TRP, a number (b) of configured downlink serving cells with multiple TRPs, and the configured multiple factor (r) for both the source cell group and the target cell group. The limit component 143 may determine a total monitoring limit of PDCCH candidates and non-overlapped control channel elements (CCEs) to monitor in a slot across both cell groups or a group monitoring limit of PDCCH candidates and non-overlapped CCEs to monitor for each of the source cell group and the target cell group. The limit component 143 may determine per cell monitoring limit of PDCCH candidates and non-overlapped CCEs to monitor in a slot per scheduled cell for single TRP cells and for multiple TRP cells based on the Ncap and a lookup value based on the sub-carrier spacing (SCS) of each cell. In some implementations, the limit component 143 may determine a per TRP limit of PDCCH candidates and non-overlapped CCEs to monitor in the slot. The overbooking component 144 may assign PDCCH candidates and CCEs to search spaces. The overbooking component 144 may prioritize one of the common search space set or the UE specific search space set based on a configuration, which may be indicated in a DAPS handover command. The decoding component 145 may receive a PDCCH within a slot via an interface and perform blind decoding operations on CCEs within at least the total monitoring limit and up to the per cell monitoring limit.

In some implementations, one or more of base station 102 may include a network PDCCH limit component 198 that may operate in conjunction with the PDCCH limit component 140 to determine the limits discussed above. In particular, the network PDCCH limit component 198 may receive capabilities signaled by the UE 104 and may transmit the configuration of serving cells including the number (a) of configured downlink serving cells with single TRP, the number (b) of configured downlink serving cells with multiple TRPs, and the configured multiple factor (r). The network PDCCH limit component 198 may determine Ncap, the total limits, the per cell limits, and the per TRP limits in the same manner as discussed above for the UE 104.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over backhaul links 134 (such as X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as macro base station), may include an eNB, gNodeB (gNB), or other type of base station. Some base stations, such as gNB 180 may operate in one or more frequency bands within the electromagnetic spectrum.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as a MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIGS. 2A-2D are resource diagrams illustrating example frame structures and resources that may be used by communications between the UE 104 and the base station 102 of FIG. 1. FIG. 2A shows a diagram 200 illustrating an example of a first subframe within a 5G NR frame structure. FIG. 2B shows a diagram 230 illustrating an example of DL channels within a 5G NR subframe. FIG. 2C shows a diagram 250 illustrating an example of a second subframe within a 5G NR frame structure. FIG. 2D shows a diagram 280 illustrating an example of UL channels within a 5G NR subframe. The 5G NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure or different channels. A frame (10 milliseconds (ms)) may be divided into 10 equally sized subframes (1 ms). Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to 2·15 kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS also may include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
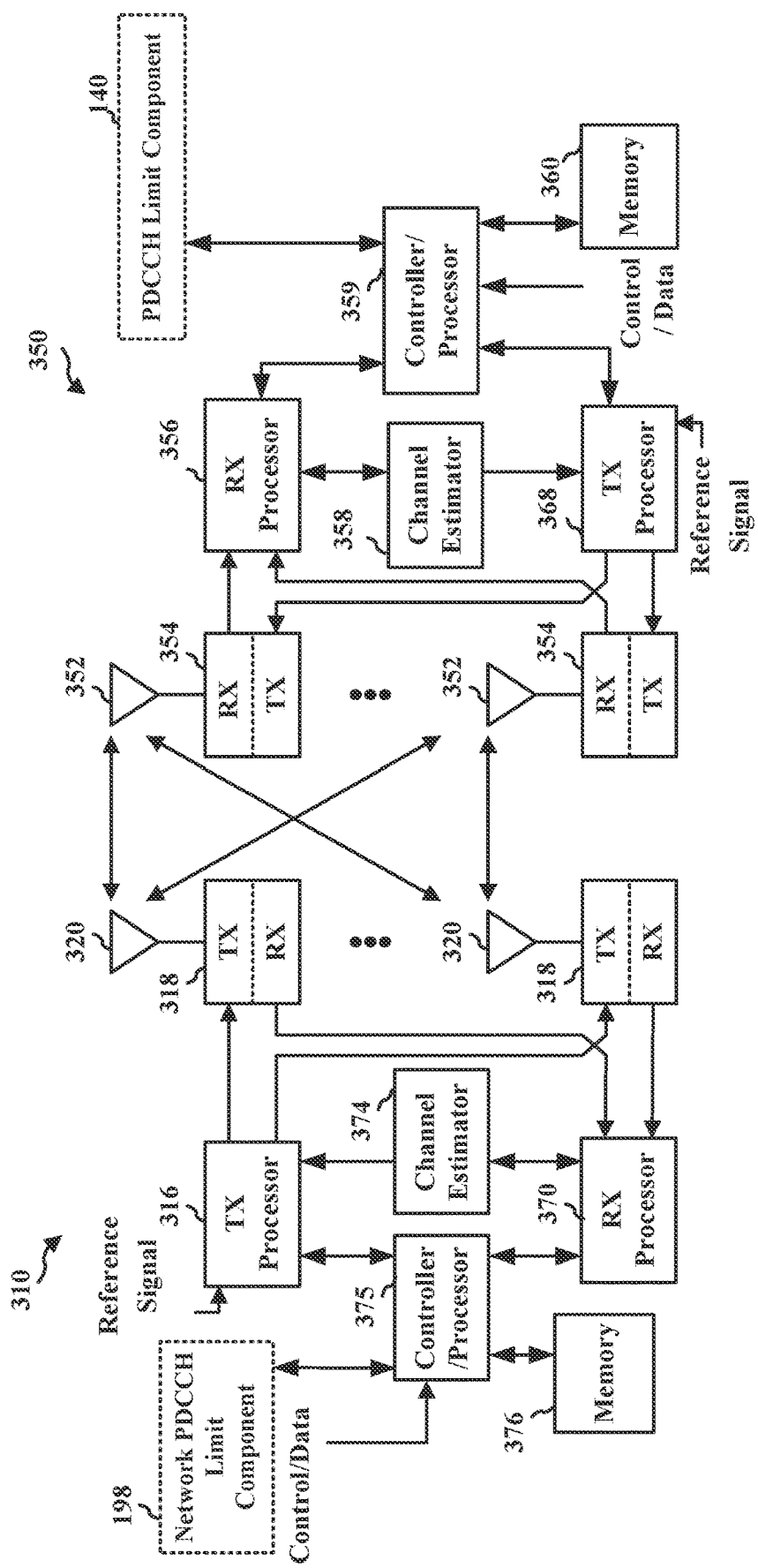
FIG. 3 shows a diagram an example of a base station (BS) and user equipment (UE) in an access network.

FIG. 3 shows a diagram an example of a base station and UE in an access network. The base station includes a network PDCCH limit component 198 in communication with a UE 350 including a PDCCH limit component 140 in the access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as pilot) in the time or frequency domain, and combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (such as MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with the PDCCH limit component 140 of FIG. 1.

At least one of the TX processor 316, the RX processor 370, and the controller/processor 375 may be configured to perform aspects in connection with network PDCCH limit component 198 of FIG. 1.

Figure 4:
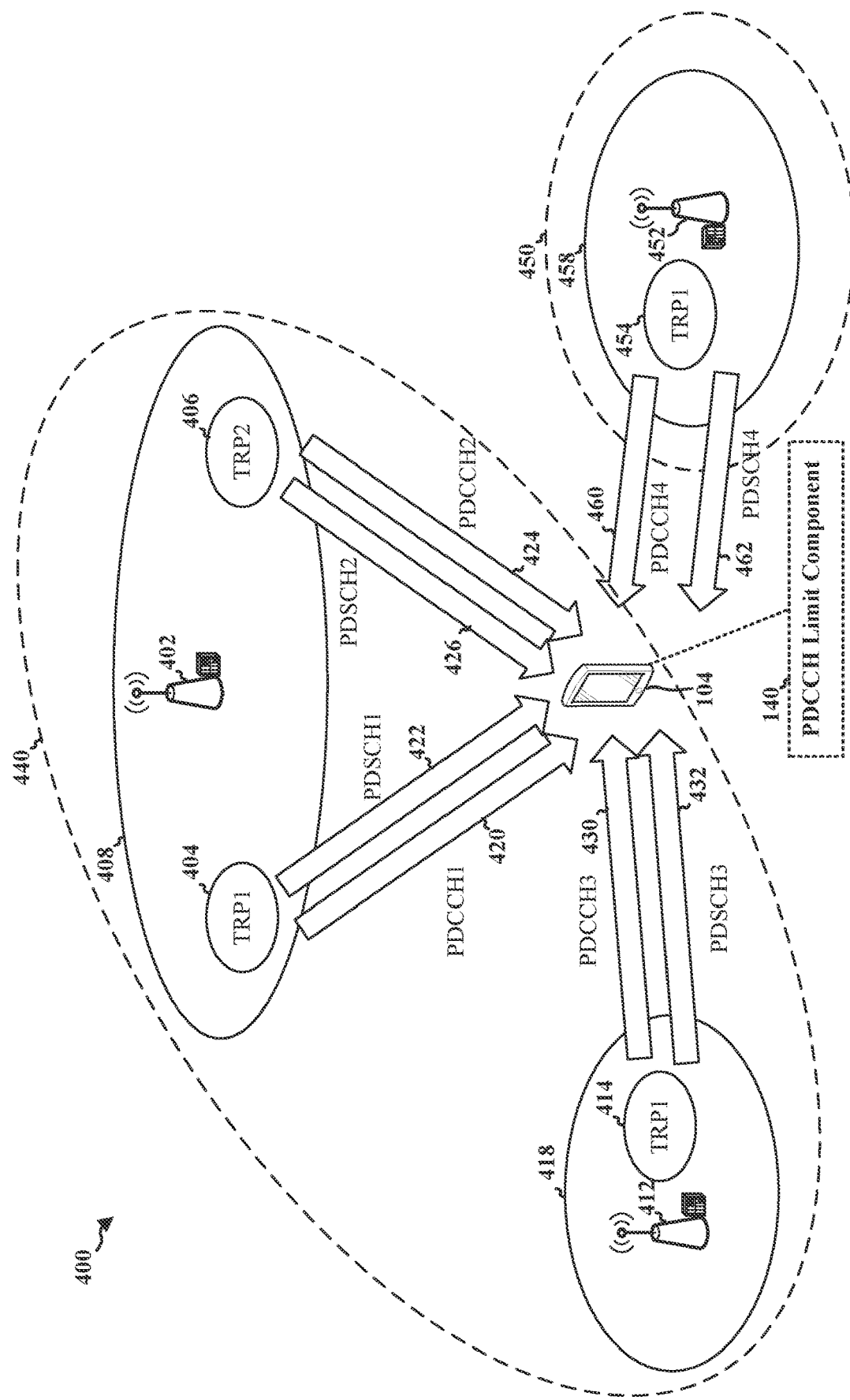
FIG. 4 shows a schematic diagram of an example configuration of serving cells for a UE.

FIG. 4 shows a schematic diagram of an example configuration 400 of serving cells for a UE. The example cell configuration 400 includes a multiple TRP cell 408 and a single TRP cell 418 for a UE 104 including a PDCCH limit component 140. The multiple TRP cell 408 may be controlled by a base station 402 and may include a first TRP 404 and a second TRP 406. The first TRP 404 may transmit a first PDCCH1 420 that schedules a first PDSCH1 422. The second TRP 406 may transmit a second PDCCH1 424 that schedules a second PDSCH 426. The single TRP cell 418 may be controlled by a base station 412 and include a single TRP 414. The single TRP 414 may transmit a third PDCCH3 430 scheduling a third PDSCH 432. In some implementations, the multiple TRP cell 408 and a single TRP cell 418 may form a source cell group 440. Additionally, in the case of a dual active protocol stack (DAPS) handover, the cell configuration 400 may include a target cell group 450, which may include, for example, a single TRP cell 458. The single TRP cell 458 may be controlled by a base station 452 and include a single TRP 454. The single TRP 454 may transmit a third PDCCH4 460 scheduling a third PDSCH 462. The cell configuration 400 may include additional cells (not shown) that may each be a single TRP cell or a multiple TRP cell and may transmit a respective PDCCH from each TRP.

In some implementations, all of the PDCCH 420, 424, 430, and 460 may be received in the same slot depending on UE capabilities and limits. In some implementations, multiple PDCCH transmissions may allow scheduling of greater amounts of data, thereby increasing the data rate for the UE 104. The UE 104, however, may be constrained (for example, by hardware limits) on the amount of PDCCH processing that may be performed. If the UE 104 were to determine capabilities or limits based on a number of serving cells for the source cell group 440, the UE 104 may not accurately account for additional PDCCHs that may be transmitted by multiple TRP cells using multiple DCIs or account for additional PDCCHs that may be transmitted by the target cell group 450. Accordingly, the UE 104 would be unable to decode all of the configured PDCCHs in some cases. The PDCCH limit component 140 may signal capabilities and determine limits taking into account multiple TRP cells such that the UE 104 may decode the PDCCHs for which it is configured. In some implementations, the PDCCH limit component 140 may implement overbooking procedures during a DAPS handover to allocate PDCCH decoding resources for a source primary cell and a target primary cell, which may be configured with PDCCH search spaces that exceed the limits.

Figure 5:
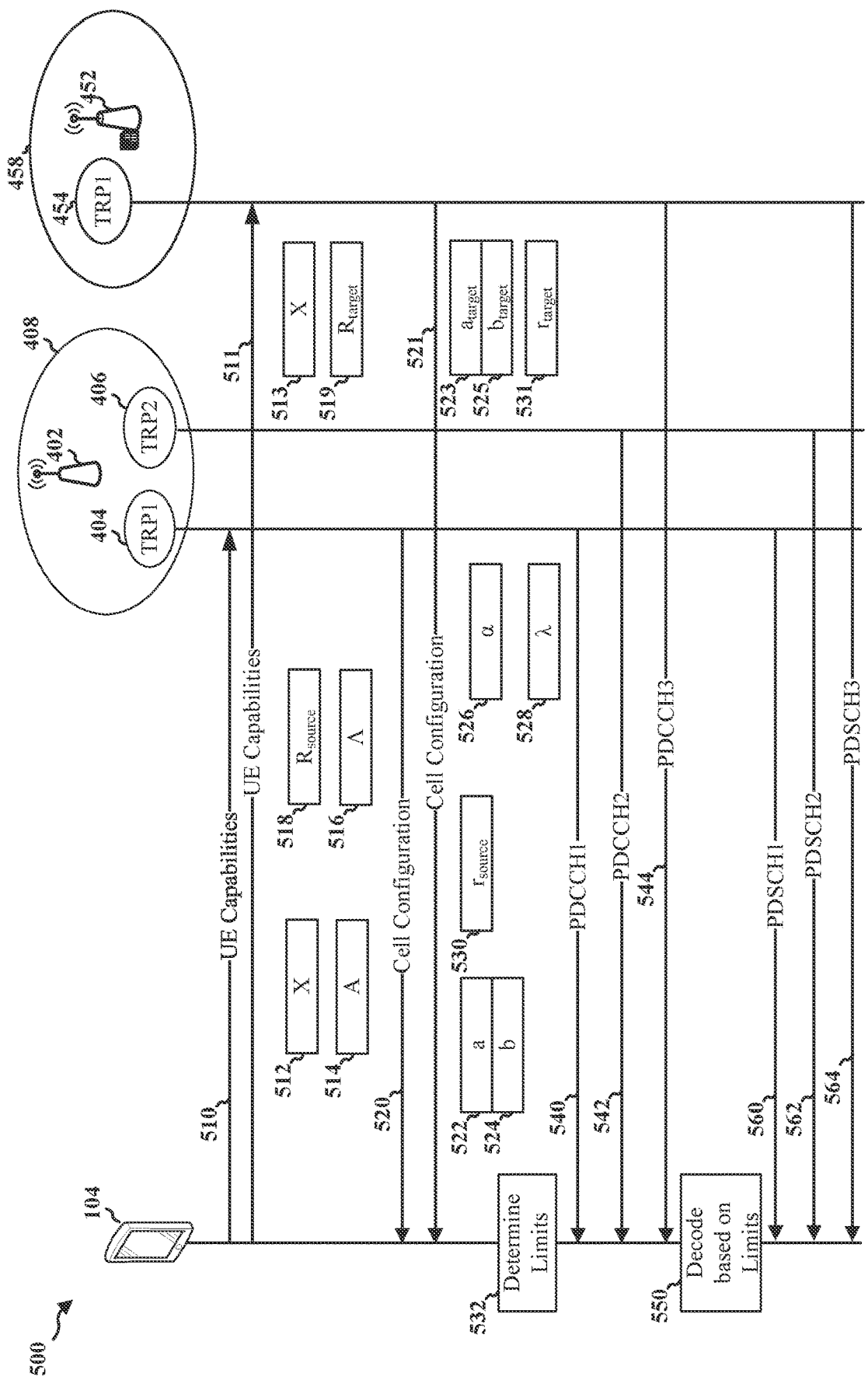
FIG. 5 shows a message diagram including example communications and processing by a UE and base station for determining PDCCH reception limits.

FIG. 5 shows a message diagram including example communications and processing by a UE and base station for determining PDCCH reception limits. The message diagram 500 illustrates example messages that may be transmitted between a UE 104, a base station 402, which may be a multiple TRP cell 408 that is the primary cell for the source cell group including a first TRP 404 and a second TRP 406, and a base station 452, which may be a single TRP cell 458 that is the primary cell for the target cell group for establishing limits for blind decoding of PDCCH during a DAPS handover from the source cell group to the target cell group.

The UE 104 may transmit UE capabilities 510 and 511 that are related to PDCCH processing. For example, the UE 104 may transmit the UE capabilities 510 to the source primary cell 408 and may transmit the UE capabilities 511 to the target primary cell 458. For example, the UE capabilities 510 may include a number (X) 512 representing PDCCH monitoring capability across all downlink serving cells. The number X may be referred to as pdcch-BlindDetectionCA. The UE 104 may determine whether to transmit X 512 based on whether the UE 104 is capable of supporting a threshold number (such as 4) of downlink serving cells. In some implementations, the number X 512 may indicate a joint PDCCH monitoring capability across all downlink serving cells for the source cell group and the target cell group. In another aspect, the number X may indicate a PDCCH monitoring capability for the source cell group and the UE capabilities 511 may include a second number Xtarget 513 indicating a PDCCH monitoring capability for the target cell group. In some implementations, capabilities 510 or 511 may include an indication of capability split (A) 514 indicating a weight or ratio of a lookup value for limits to divide blind decoding resources between the source cell group and target cell group. In some implementations, capabilities 510 or 511 may include an indication of a priority (A) 516 between blind decode capability for the source cell group and the target cell group. The UE capabilities 510 may include a multiple factor capability (R) 518 indicating a capability to perform additional PDCCH monitoring or additional non-overlapped CCEs to monitor for multiple TRP cells. In some implementations, R 518 may be applicable to both the source cell group and the target cell group. In some other implementations, R 518 may be applicable to the source cell group and the capabilities 511 may include a second multiple factor capability ($R_{target}$) indicating a capability to perform additional PDCCH monitoring or additional non-overlapped CCEs to monitor for multiple TRP cells of the target cell group.

One or both of the base station 402 and the base station 452 may transmit a cell configuration 520 or 521 that may configure the UE 104 with a plurality of serving cells. For example, the cell configuration 520 may include or may indicate a number of single TRP cells (a) 522 and a number of multiple TRP cells (b) 524. The cell configuration 520 may include a configured multiple factor ($r_{source}$) 530 indicating a network selected multiple factor. The cell configuration 520 may set the value of $r_{source}$ 530 to 1 or the value of R 518. If the cell configuration 520 does not include the configured multiple factor $r_{source}$ 530, the UE 104 may set the value of $r_{source}$ 530 to the value of R 518. The cell configuration 521 from the target base station 452 may be similar to the cell configuration 520. The cell configuration 521 may be included in a DAPS handover command. For example, the cell configuration 521 may include a number of single TRP cells ($a_{target}$) 523 and a number of multiple TRP cells ($b_{target}$) 525 for the target cell group. In some implementations, cell configuration 520 or 521 may include a configured capability split (a) 526 indicating a weight or ratio for the lookup value for limits. In some implementations, cell configuration 520 or 521 may include a configured priority (k) 528 between the source cell group and the target cell group. The cell configuration 521 also may include a configured multiple factor ($r_{target}$) 531 indicating a network selected multiple factor for the target cell group. The cell configuration 521 may set the value of $r_{target}$ 531 to 1 or the value of $R_{target}$ 519. If the cell configuration 521 does not include the configured multiple factor $r_{target}$ 531, the UE 104 may set the value of $r_{target}$ 531 to the value of R 519 or the value of $r_{source}$ 530.

In block 532, the UE 104 may determine limits on PDCCH reception. For example, the UE 104 may determine a total monitoring limit of PDCCH candidates and non-overlapped CCEs to monitor in a slot for a cell group. A maximum number of monitored PDCCH candidates for an SCS may be referred to as a lookup value or $M_{PDCCH}^{max,slot,\mu}$. $M_{PDCCH}^{max,slot,\mu}$ may be determined based on the following table:

TABLE 10.1-2

Maximum number $M_{PDCCH}^{max,\ slot,\ \mu}$ of monitored PDCCH candidates per slot for a DL BWP with SCS configuration $\mu \in \{0, 1, 2, 3\}$ for a single serving cell

| $\mu$ | Maximum number of monitored PDCCH candidates per slot and per serving cell $M_{PDCCH}^{max,\ slot,\ \mu}$ |
|---|---|
| 0 | 44 |
| 1 | 36 |
| 2 | 22 |
| 3 | 20 |

A maximum number of the number of non-overlapped CCEs may be referred to as $C_{PDCCH}^{max,slot,\mu}$. $C_{PDCCH}^{max,slot,\mu}$ may be determined based on the following table:

TABLE 10.1-3

Maximum number $C_{PDCCH}^{max,\ slot,\ \mu}$ of non-overlapped CCEs per slot for a DL BWP with SCS configuration $\mu \in \{0, 1, 2, 3\}$ for a single serving cell

| $\mu$ | Maximum number of non-overlapped CCEs per slot and per serving cell $C_{PDCCH}^{max,\ slot,\ \mu}$ |
|---|---|
| 0 | 56 |
| 1 | 56 |
| 2 | 48 |
| 3 | 32 |

As discussed in further detail, the limits may account for multiple TRP cells as opposed to a single serving cell with a single TRP as well as the DAPS handover scenario with a source cell group and a target cell group. In some implementations, a total monitoring limit may apply to all serving cells in both the source cell group and the target cell group. In some other implementations, a separate total monitoring limit may apply to each of the source cell group and the target cell group. The UE 104 also may determine a per cell monitoring limit. In some implementations, the per cell monitoring limit for multiple TRP cells may be based on the multiple factor.

The base station 402 may transmit a first PDCCH1 540 and a second PDCCH2 542, and the UE 104 may receive the first PDCCH1 540 and the second PDCCH2 542 as well as other PDCCHs transmitted by other serving cells based on the limits determined in block 532. For example, the UE 104 also may receive a third PDCCH3 544 from the base station 452. In some implementations, the network may be aware of the limits based on the UE capabilities 510 and 511 and the cell configurations 520 and 521 and may avoid transmitting a PDCCH that would exceed the limits of the UE. In some implementations, however, a primary serving cell for either the source cell group or the target cell group may use overbooking to configure the UE 104 with PDCCH candidates that may result in exceeding the limits on monitoring PDCCH candidates or non-overlapped CCEs. The UE 104 may use overbooking procedures to assign PDCCH candidates or non-overlapped CCEs monitoring limits to search spaces when overbooking occurs.

In block 550, the UE 104 may perform decoding based on the limits. That is, the UE 104 may decode PDCCH candidates up to the limit of PDCCH candidates ($M_{PDCCH}^{max,slot,\mu}$) on up to the limit of non-overlapped CCEs ($C_{PDCCH}^{max,slot,\mu}$). In the case of overbooking, even if the UE 104 is configured with PDCCH candidates that exceed the limit (such as based on the number of candidates and corresponding aggregation levels of the configured search spaces), the UE 104 may abide by the limits and stop decoding when one or more of the limits is reached.

The base station 402 may transmit a first PDSCH 560 and a second PDSCH 562 from the first TRP 404 and the second TRP 406, respectively. The UE 104 may receive the first PDSCH 560 and the second PDSCH 562 based on the decoded PDCCHs 540, 542. The base station 452 may transmit a third PDSCH 564. The UE 104 may receive the third PDSCH 564 based on the decoded PDCCH 544.

Figure 6:
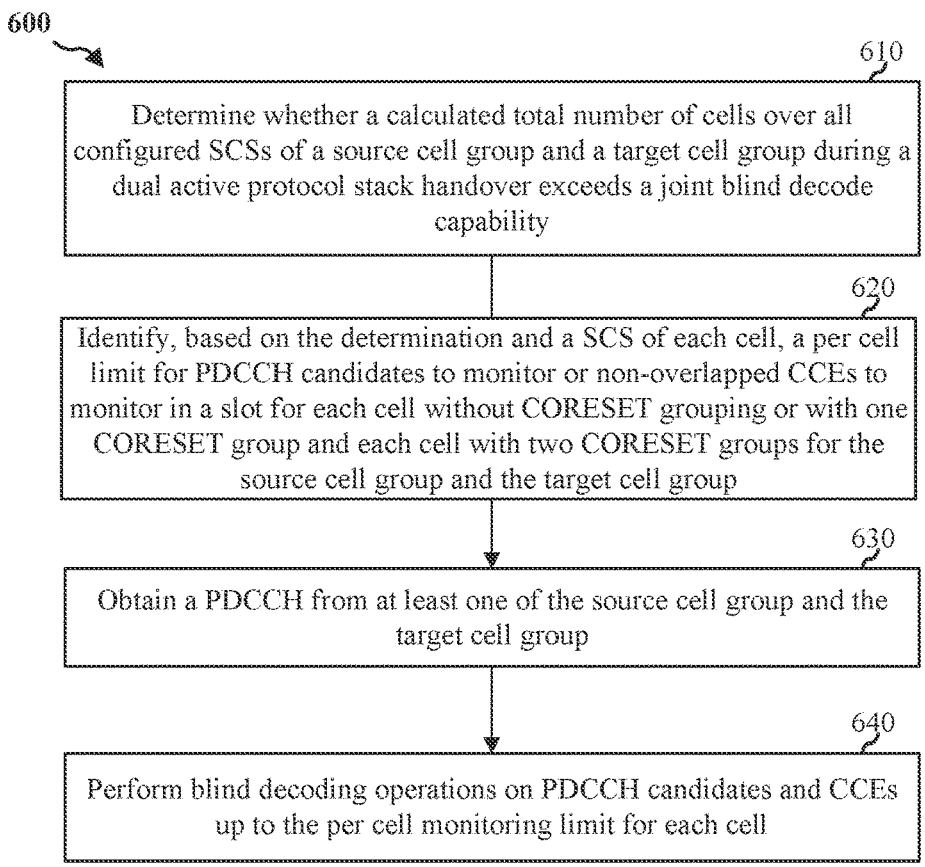
FIG. 6 shows a flowchart of a first example method for determining PDCCH decoding limits for both a source cell group and a target cell group.

FIG. 6 shows a flowchart of a first example method 600 for determining PDCCH decoding limits for both a source cell group and a target cell group. The method 600 of wireless communication may be performed by a UE (such as the UE 104, which may include the memory 360 and which may be the entire UE 104 or a component of the UE 104 such as the PDCCH limit component 140, TX processor 368, the RX processor 356, or the controller/processor 359) for establishing limits for blind decoding of PDCCH.

In block 610, the method 600 may include determining whether a calculated total number of cells over all configured SCSs of a source cell group and a target cell group during a dual active protocol stack handover exceeds a joint blind decode capability. In some implementations, for example, the UE 104, or the controller/processor 359 may execute the PDCCH limit component 140 or the capability component 141 to determine whether a calculated total number of cells over all configured SCSs of a source cell group and a target cell group during a dual active protocol stack handover exceeds a joint blind decode capability (Ncap). In some implementations, the capability component 141 may determine the calculated total number of cells for the source cell group and the target cell group for a given SCS as a number of single TRP cells in the source cell group ($N_{cells,\ target}^{DL,\ sTRP,\mu}$) and in the target cell group ($N_{cells,\ target}^{DL,\ sTRP,\mu}$) with the same SCS plus a multiple factor ($r_{source}$) for the source cell group times a number of multiple TRP cells in the source cell group ($N_{cells,\ target}^{DL,\ m\text{-}TRP,\mu}$) with the same SCS plus a multiple factor for the target cell group ($r_{target}$) times a number of multiple TRP cells in the target cell group ($N_{cells,\ target}^{DL,\ m\text{-}TRP,\mu}$) with the same SCS. The configuration component 142 may determine the calculated total number of cells over all configured SCSs of a source cell group and a target cell group as the sum over all configured SCS. Accordingly, the UE 104 or the controller/processor 359 executing the PDCCH limit component 140, the capability component 141, or the configuration component 142 may provide means for determining whether a calculated total number of cells over all configured sub-carrier spacings (SCSs) of a source cell group and a target cell group during a dual active protocol stack handover exceeds a joint blind decode capability.

In block 620, the method 600 may include identifying, based on the determination and a SCS of each cell, a per cell limit for PDCCH candidates to monitor or non-overlapped CCEs to monitor in a slot for each cell without CORESET grouping or with one CORESET group and each cell with two CORESET groups for the source cell group and the target cell group. In some implementations, for example, the UE 104, or the controller/processor 359 may execute the PDCCH limit component 140 or the limit component 143 to identify, based on the determination and a SCS of each cell, a per cell limit for PDCCH candidates to monitor or non-overlapped CCEs to monitor in a slot for each cell without CORESET grouping or with one CORESET group and each cell with two CORESET groups for the source cell group and the target cell group. Further details of the operation of limit component 143 in identifying the per cell limit are described with respect to FIG. 7. In some implementations, the limit component 143 may identify the per cell limit for PDCCH candidates to monitor or non-overlapped CCEs to monitor in a slot for each cell without CORESET grouping or with one CORESET group and each cell with two CORESET groups for the source cell group and the target cell group based on the determination and a lookup value for the SCS of each cell for the cell group of the cell as described in further detail in FIGS. 9 and 10. Accordingly, the UE 104, or the controller/processor 359 executing the PDCCH limit component 140 or the limit component 143 may provide means for identifying, based on the determination and a SCS of each cell, a per cell limit for PDCCH candidates to monitor or non-overlapped CCEs to monitor in a slot for each cell without CORESET grouping or with one CORESET group and each cell with two CORESET groups for the source cell group and the target cell group.

In block 630, the method 600 may include obtaining a PDCCH from at least one of the source cell group and the target cell group. In some implementations, for example, the UE 104, or the controller/processor 359 may execute the PDCCH limit component 140 or the decoding component 145 to obtain a PDCCH from at least one of the source cell group and the target cell group. Accordingly, the UE 104, RX processor 356 or the controller/processor 359 executing the PDCCH limit component 140 or the decoding component 145 may provide means for identifying, based on the determination and a SCS of each cell, a per cell limit for PDCCH candidates to monitor or non-overlapped CCEs to monitor in a slot for each single TRP cell and each multiple TRP cell for the source cell group and the target cell group.

In block 640, the method 600 may include performing blind decoding operations on PDCCH candidates and CCEs up to the per cell monitoring limit for each cell. In some implementations, for example, the UE 104, or the controller/processor 359 may execute the PDCCH limit component 140 or the decoding component 145 to perform blind decoding operations on PDCCH candidates and CCEs up to the per cell monitoring limit for each cell. Accordingly, the UE 104, RX processor 356 or the controller/processor 359 executing the PDCCH limit component 140 or the decoding component 145 may provide means for performing blind decoding operations on PDCCH candidates and CCEs up to the per cell monitoring limit for each cell.

Figure 7:
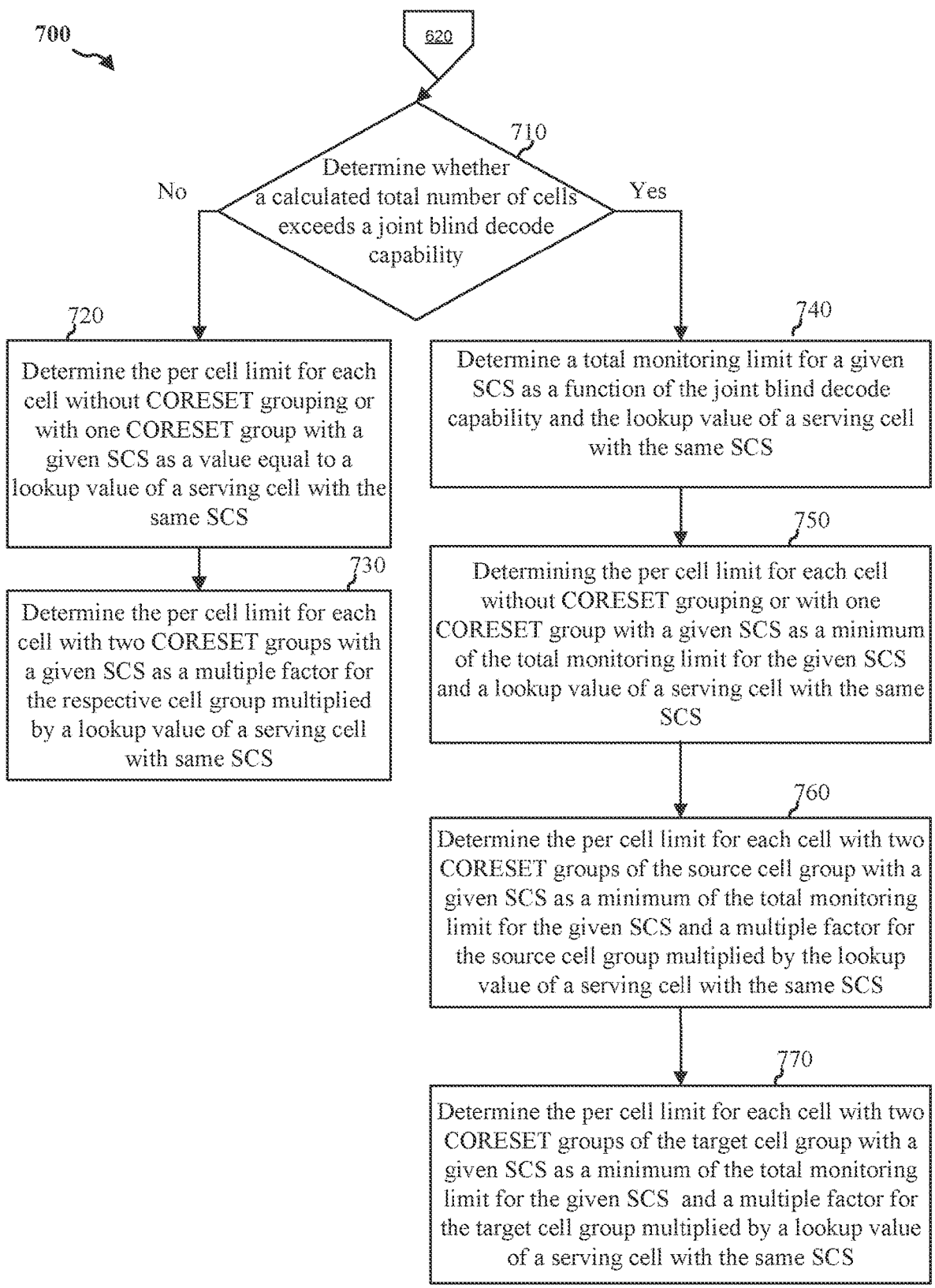
FIG. 7 shows a flowchart of an example method for determining per cell limits for both a source cell group and a target cell group.

FIG. 7 shows a flowchart of an example method 700 for determining per cell limits for both a source cell group and a target cell group. The method 700 may be performed by a UE (such as the UE 104, which may include the memory 360 and which may be the entire UE 104 or a component of the UE 104 such as the PDCCH limit component 140, TX processor 368, the RX processor 356, or the controller/processor 359) for determining a total monitoring limit and per cell monitoring limits. In some implementations, the method 700 may correspond to block 620 of the method 600. The method 700 may be performed by the limit component 143.

At decision block 710, the method 700 may include determining whether the calculated total number of cells exceeds the joint blind decode capability. For example, the capability component 141 may determine whether the calculated total number of cells exceeds the joint blind decode capability. The calculated number of serving cells may be determined based on configured cells for each SCS µ. For example, $N_{cells,sTRP}^{DL,\mu}$, and $N_{cells,mTRP}^{DL,\mu}$ representing the number of downlink cells that the UE 104 is configured with single TRP and multi-TRP operation, respectively, and having active downlink BWP with SCS µ. Accordingly, in the case of 4 maximum downlink BWP, the calculated number of serving cells may be expressed as $\Sigma_{\mu=0}^{3}= [(N_{cells,source}^{DL,sTRP,\mu}+N_{cells,target}^{DL,sTRP,\mu})+(r_{source}\cdot N_{cells,source}^{DL,mTRP,\mu}+r_{target}\cdot N_{cells,target}^{DL,mTRP,\mu})]$ That is, the limit component 143 may determine whether the number of configured downlink serving cells with single TRP in the source cell group and the target cell group plus the multiple factor for the source cell group multiplied by the number of configured downlink serving cells with multiple TRPs in the cell group plus the multiple factor for the target cell group multiplied by the number of configured downlink serving cells with multiple TRPs in the target group is less than or equal to the Ncap. If $\Sigma_{\mu=0}^{3}=[(N_{cells,source}^{DL,sTRP,\mu}+N_{cells,target}^{DL,sTRP,\mu})+(r_{source}\cdot N_{cells,source}^{DL,mTRP,\mu}+r_{target}\cdot N_{cells,target}^{DL,mTRP,\mu})]\le N_{cell}^{cap}$, the method 700 may proceed to block 720. If $\Sigma_{\mu=0}^{3}=[(N_{cells,source}^{DL,sTRP,\mu}+N_{cells,target}^{DL,sTRP,\mu})+(r_{source}\cdot N_{cells,source}^{DL,mTRP,\mu}+r_{target}\cdot N_{cells,target}^{DL,mTRP,\mu})]N_{cells}^{cap}$, the method 700 may proceed to block 740.

In block 720, the method 700 may include determining the per cell limit for each cell without CORESET grouping or with one CORESET group with a given SCS as a value equal to a lookup value of a serving cell with the same SCS. For example, the limit component 143 may determine the per cell limit for each cell without CORESET grouping or with one CORESET group with a given SCS as a value equal to a lookup value of a serving cell with the same SCS. That is, the limit of PDCCH candidates per scheduled cell for cells configured without CORESET grouping or with one CORESET group may be $M_{PDCCH}^{max,slot,\mu}$ and the limit of non-overlapped CCEs per scheduled cell for cells configured without CORESET grouping or with one CORESET group may be $C_{PDCCH}^{max,slot,\mu}$.

In block 730, the method 700 may include determining the per cell limit for each cell with two CORESET groups with a given SCS as a multiple factor for the respective cell group multiplied by a lookup value of a serving cell with the same SCS. For example, the limit component 143 may determine the per cell limit for each cell with two CORESET groups with a given SCS as a multiple factor for the respective cell group multiplied by a lookup value of a serving cell with the same SCS. That is, for the source cell group, the limit of PDCCH candidates per scheduled cell for cells configured with two CORESET groups may be $r_{source} M_{PDCCH}^{max,slot,\mu}$ and the limit of non-overlapped CCEs per scheduled cell for cells configured with two CORESET groups may be $r_{source} C_{PDCCH}^{max,slot,\mu}$. Similarly, for the target cell group, the limit of PDCCH candidates per scheduled cell for cells configured with two CORESET groups may be $r_{target} M_{PDCCH}^{max,slot,\mu}$ and the limit of non-overlapped CCEs per scheduled cell for cells configured with two CORESET groups may be $r_{target} C_{PDCCH}^{max,slot,\mu}$.

In block 740, the method 700 may include determining a total monitoring limit for a given SCS as a function of the joint blind decode capability and the lookup value of a serving cell with the same SCS. For instance, the limit component 143 may determine the total monitoring limit for a given SCS as a function of the joint blind decode capability and the lookup value of a serving cell with the same SCS. In some implementations, function may be a floor of the joint blind decode capability times the lookup value of a serving cell with the same SCS multiplied by a ratio of the calculated number of cells with the same SCS in the source cell group and target cell group to the calculated total number of cells across all configured SCSs for the source cell group and the target cell group. The limit component 143 may determine the total monitoring limit of PDCCH candidates for all downlink cells with a given SCS as:

$$M_{PDCCH}^{total,slot,\mu} = \left\lfloor N_{cells}^{cap} \cdot M_{PDCCH}^{max,slot,\mu} \frac{A}{B} \right\rfloor$$

Where A and B are given by $$A = \left[(N_{cells,source}^{DL,sTRP,\mu} + N_{cells,target}^{DL,sTRP,\mu}) + (r_{source} \cdot N_{cells,source}^{DL,mTRP,\mu} + r_{target} \cdot N_{cells,target}^{DL,mTRP,\mu})\right]$$

$$B = \sum_{j=0}^{3}\left[(N_{cells,source}^{DL,sTRP,j} + N_{cells,target}^{DL,Strp,j}) + (r_{source} \cdot N_{cells,source}^{DL,mTRP,j} + r_{target} \cdot N_{cells,target}^{DL,mTRP,j})\right]$$

Similarly, the limit component 143 may determine the total monitoring limit of non-overlapped CCEs for all downlink cells with a given SCS as:

$$C_{PDCCH}^{total,slot,\mu} = \left\lfloor N_{cells}^{cap} \cdot C_{PDCCH}^{max,slot,\mu} \frac{A}{B} \right\rfloor$$

In block 750, the method 700 may include determining the per cell limit for each cell without CORESET grouping or with one CORESET group with a given SCS as a minimum of the total monitoring limit for the given SCS and a lookup value of a single TRP serving cell with the same SCS. For instance, the limit component 143 may determine the per cell limit for cells without CORESET grouping or with one CORESET group as $\min(M_{PDCCH}^{max,slot,\mu}, M_{PDCCH}^{total,slot,\mu})$ and determine the per cell limit of non-overlapped CCEs as $\min(C_{PDCCH}^{max,slot,\mu}, C_{PDCCH}^{total,slot,\mu})$.

In block 760, the method 700 may include determining the per cell limit for each cell with two CORESET groups of the source cell group with a given SCS as a minimum of the total monitoring limit for the given SCS and a multiple factor for the source cell group multiplied by the lookup value of a serving cell with the same SCS. For instance, the limit component 143 may determine the per cell limit of PDCCH candidates for cells with two CORESET groups as $\min(r_{source}M_{PDCCH}^{max,slot,\mu}, M_{PDCCH}^{total,slot,\mu})$ and determine the per cell limit of non-overlapped CCEs as $\min(r_{source}C_{PDCCH}^{max,slot,\mu}, C_{PDCCH}^{total,slot,\mu})$.

In block 770, the method 700 may include determining the per cell limit for each cell with two CORESET groups of the target cell group with a given SCS as a minimum of the total monitoring limit for the given SCS and a multiple factor for the target cell group multiplied by the lookup value of a serving cell with the same SCS. For instance, the limit component 143 may determine the per cell limit of PDCCH candidates for cells with two CORESET groups as $\min(r_{source}M_{PDCCH}^{max,slot,\mu}, M_{PDCCH}^{total,slot,\mu})$ determine the per cell limit of non-overlapped CCEs as $\min(r_{source}C_{PDCCH}^{max,slot,\mu}, C_{PDCCH}^{total,slot,\mu})$.

Figure 8:
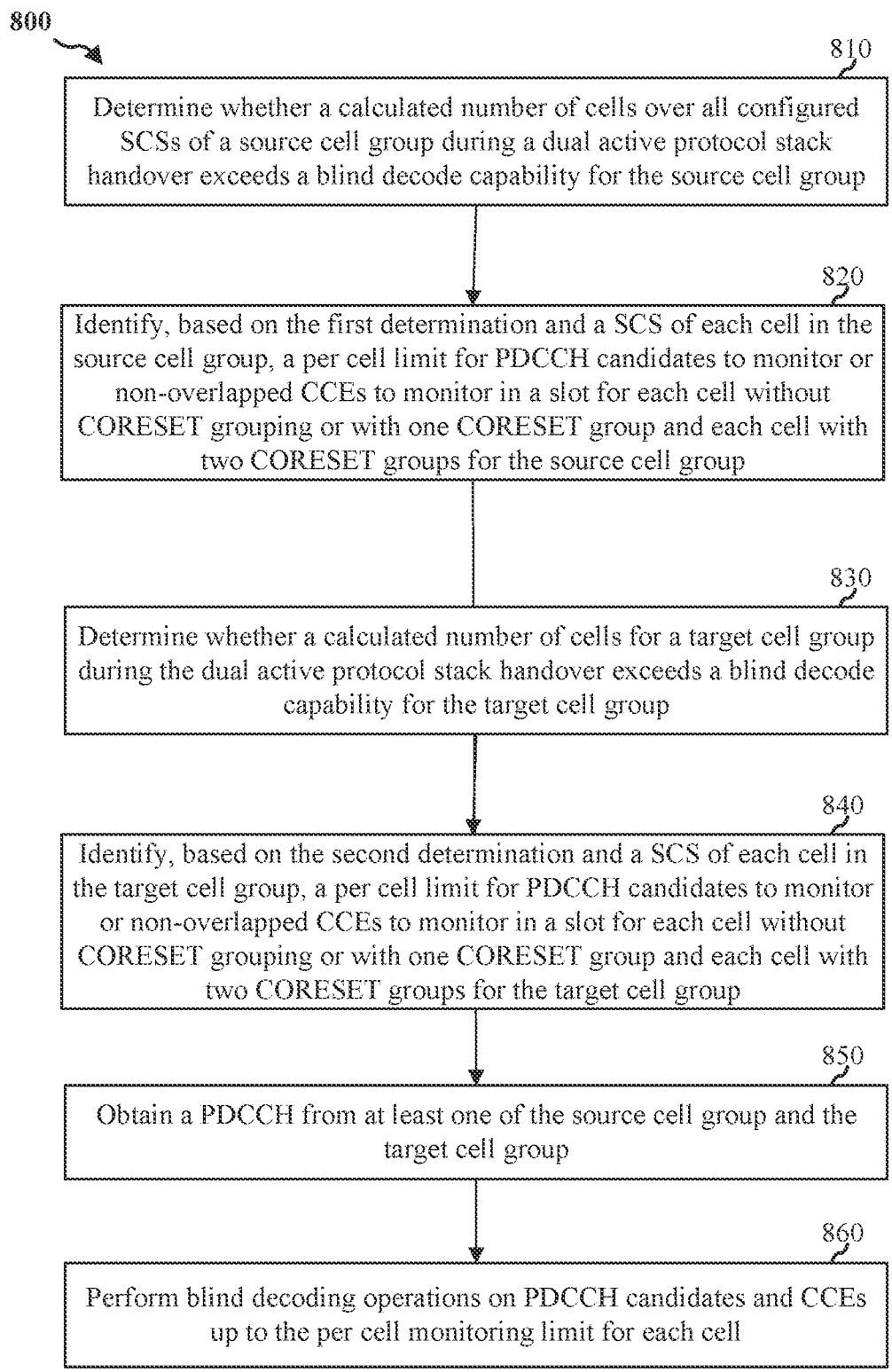
FIG. 8 shows a flowchart of a second example method for determining PDCCH decoding limits separately for a source cell group and a target cell group.

FIG. 8 shows a flowchart of a second example method 800 for determining PDCCH decoding limits separately for a source cell group and a target cell group. The method 800 may be performed by a UE (such as the UE 104, which may include the memory 360 and which may be the entire UE 104 or a component of the UE 104 such as the PDCCH limit component 140, TX processor 368, the RX processor 356, or the controller/processor 359) for establishing limits for blind decoding of PDCCH.

In block 810, the method 800 may include determining whether a calculated number of cells over all configured SCSs of a source cell group during a dual active protocol stack handover exceeds a blind decode capability for the source cell group. In some implementations, for example, the UE 104, or the controller/processor 359 may execute the PDCCH limit component 140 or the capability component 141 to determine whether a calculated number of cells over all configured SCSs of a source cell group during a dual active protocol stack handover exceeds a blind decode capability for the source cell group. In some implementations, the capability component 141 may determine the calculated total number of cells for the source cell group and the target cell group for a given SCS as number of cells without CORESET grouping or with one CORESET group with the same SCS in the source cell group plus a multiple factor for the source cell group times a number of cells with two CORESET groups with the same SCS in the source cell group. The capability component 141 may determine the calculated number of cells over all configured SCSs of a source cell group as the sum over all configured SCS. In some implementations, the capability component 141 may determine the blind decode capability for the source cell group ($N_{cells,source}^{cap}$). The capability component 141 may report $N_{cells,source}^{cap}$ to the network or the network may configure the $N_{cells,source}^{cap}$ and $N_{cells,target}^{cap}$ In another aspect, the capability component 141 may report a joint capability such as Ncap, and the capability component 141 may compute $N_{cells,source}^{cap}$ and $N_{cells,target}^{cap}$ based on a configured number of cells. For example:

$$N_{cells,source}^{cap} = N_{cells}^{cap} \frac{\left(N_{cells,source}^{DL,sTRP,\mu}\right) + \left(r_{source} \cdot N_{cells,source}^{DL,mTRP,\mu}\right)}{\sum_{j=0}^{3}\left[\left(N_{cells,source}^{DL,sTRP,j} + N_{cells,target}^{DL,sTRP,j}\right) + \left(r_{source} \cdot N_{cells,source}^{DL,mTRP,j} + r_{target} \cdot N_{cells,target}^{DL,mTRP,j}\right)\right]}$$

$$N_{cells,target}^{cap} = N_{cells}^{cap} \frac{\left(N_{cells,target}^{DL,sTRP,\mu}\right) + \left(r_{source} \cdot N_{cells,source}^{DL,mTRP,\mu}\right)}{\sum_{j=0}^{3}\left[\left(N_{cells,source}^{DL,sTRP,j} + N_{cells,target}^{DL,sTRP,j}\right) + \left(r_{source} \cdot N_{cells,source}^{DL,mTRP,j} + r_{target} \cdot N_{cells,target}^{DL,mTRP,j}\right)\right]}$$

In another implementation, instead of using a ratio based on the number of cells, the capability component 141 may use a requested or configured ratio such as, 528. For example, $N_{cells,source}^{cap} = \lambda_{source} \cdot N_{cells}^{cap}$, $N_{cells,target}^{cap} = \lambda_{target} \cdot N_{cells}^{cap}$, and $\lambda_{source} = 1 - \lambda_{target}$.

Accordingly, the UE 104 or the controller/processor 359 executing the PDCCH limit component 140 or the capability component 141 may provide means for determining whether a calculated number of cells over all configured SCSs of a source cell group during a dual active protocol stack handover exceeds a blind decode capability for the source cell group.

In block 820, the method 800 may include identifying, based on the first determination and a SCS of each cell in the source cell group, a per cell limit for PDCCH candidates to monitor or non-overlapped CCEs to monitor in a slot for each cell without CORESET grouping or with one CORESET group and each cell with two CORESET groups for the source cell group. In some implementations, for example, the UE 104, or the controller/processor 359 may execute the PDCCH limit component 140 or the limit component 143 to identify, based on the first determination and a SCS of each cell in the source cell group, a per cell limit for PDCCH candidates to monitor or non-overlapped CCEs to monitor in a slot for each cell without CORESET grouping or with one CORESET group and each cell with two CORESET groups for the source cell group. Further details of the operation of limit component 143 in identifying the per cell limit are described with respect to FIG. 9. Accordingly, the UE 104, or the controller/processor 359 executing the PDCCH limit component 140 or the limit component 143 may provide means for identifying, based on the first determination and a SCS of each cell in the source cell group, a per cell limit for PDCCH candidates to monitor or non-overlapped CCEs to monitor in a slot for each cell without CORESET grouping or with one CORESET group and each cell with two CORESET groups for the source cell group.

In block 830, the method 800 may include determining whether a calculated number of cells for a target cell group during the dual active protocol stack handover exceeds a blind decode capability for the target cell group. In some implementations, for example, the UE 104, or the controller/processor 359 may execute the PDCCH limit component 140 or the capability component 141 to determine whether a calculated number of cells for a target cell group during the dual active protocol stack handover exceeds a blind decode capability for the target cell group. In some implementations, the capability component 141 may determine the calculated number of cells for the target cell group for a given SCS as a number of cells without CORESET grouping or with one CORESET group with the same SCS in the target cell group plus a multiple factor for the target cell group times a number of cells with two CORESET groups with the same SCS in the target cell group. The capability component 141 may determine the calculated number of cells over all configured SCSs of the target cell group as the sum over all configured SCS. The capability component 141 may determine the blind decode capability for the target cell group as discussed above regarding block 810. Accordingly, the UE 104 or the controller/processor 359 executing the PDCCH limit component 140 or the capability component 141 may provide means for determining whether a calculated number of cells for a target cell group during the dual active protocol stack handover exceeds a blind decode capability for the target cell group.

In block 840, the method 800 may include identifying, based on the second determination and a SCS of each cell in the target cell group, a per cell limit for PDCCH candidates to monitor or non-overlapped CCEs to monitor in a slot for each cell without CORESET grouping or with one CORESET group and each cell with two CORESET groups for the source cell group. In some implementations, for example, the UE 104, or the controller/processor 359 may execute the PDCCH limit component 140 or the limit component 143 to identify, based on the second determination and a SCS of each cell in the target cell group, a per cell limit for PDCCH candidates to monitor or non-overlapped CCEs to monitor in a slot for each cell without CORESET grouping or with one CORESET group and each cell with two CORESET groups for the source cell group. Further details of the operation of limit component 143 in identifying the per cell limit are described with respect to FIG. 9. Accordingly, the UE 104, or the controller/processor 359 executing the PDCCH limit component 140 or the limit component 143 may provide means for identifying, based on the second determination and a SCS of each cell in the target cell group, a per cell limit for PDCCH candidates to monitor or non-overlapped CCEs to monitor in a slot for each cell without CORESET grouping or with one CORESET group and each cell with two CORESET groups for the source cell group.

In block 850, the method 800 may include obtaining a PDCCH from at least one of the source cell group and the target cell group. In some implementations, for example, the UE 104, the RX processor 356 or the controller/processor 359 may execute the PDCCH limit component 140 or the decoding component 145 to obtain a PDCCH from at least one of the source cell group and the target cell group. Accordingly, the UE 104, RX processor 356, or the controller/processor 359 executing the PDCCH limit component 140 or the limit component 143 may provide means for obtaining a PDCCH from at least one of the source cell group and the target cell group.

In block 860, the method 800 may include performing blind decoding operations on PDCCH candidates and CCEs up to the per cell monitoring limit for each cell. In some implementations, for example, the UE 104, or the controller/processor 359 may execute the PDCCH limit component 140 or the decoding component 145 to perform blind decoding operations on PDCCH candidates and CCEs up to the per cell monitoring limit for each cell. Accordingly, the UE 104, RX processor 356 or the controller/processor 359 executing the PDCCH limit component 140 or the decoding component 145 may provide means for performing blind decoding operations on PDCCH candidates and CCEs up to the per cell monitoring limit for each cell.

Figure 9:
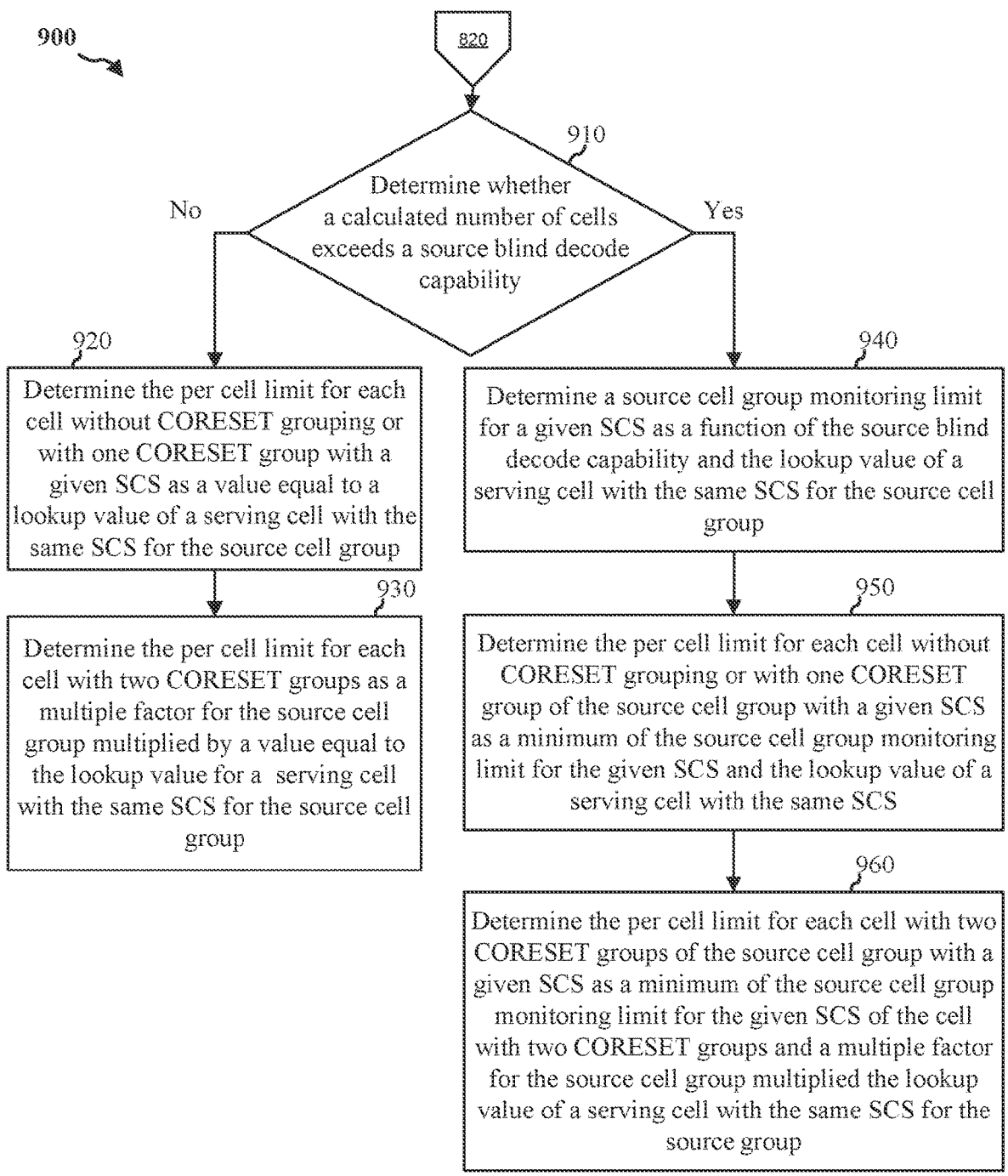
FIG. 9 shows a flowchart of an example method for determining per cell limits for source cell group.

FIG. 9 shows a flowchart of an example method 900 for determining per cell limits for source cell group. The method 900 of wireless communication that may be performed by a UE (such as the UE 104, which may include the memory 360 and which may be the entire UE 104 or a component of the UE 104 such as the PDCCH limit component 140, TX processor 368, the RX processor 356, or the controller/processor 359) for determining a source cell group monitoring limit and per cell monitoring limits. In some implementations, the method 900 may correspond to block 820 of the method 800. The method 900 may be performed by the limit component 143.

At decision block 910, the method 900 may include determining whether the calculated number of cells for the source cell group exceeds a source blind decode capability. The calculated number of cells for the source cell group may be determined based on configured cells for each SCS $\mu$. For example, $N_{cells,source}^{DL,sTRP,\mu}$ and $N_{cells,source}^{DL,mTRP,\mu}$ representing the number of downlink cells that the UE 104 is configured with single TRP and multi-TRP operation, respectively, and having active downlink BWP with SCS $\mu$ in the source cell group. Accordingly, in the case of 4 maximum downlink BWP, the calculated number of serving cells may be expressed as $\Sigma_{\mu=0}^{3}(N_{cells,source}^{DL,sTRP,\mu}++ r_{source} \cdot N_{cells,source}^{DL,mTRP,\mu})$. That is, the limit component 143 may determine whether the number of configured downlink serving cells without CORESET grouping or with one CORESET group in the source cell group plus the multiple factor for the source cell group multiplied by the number of configured downlink serving cells with two CORESET groups in the source cell group is less than or equal to the $Ncap_{source}$. If $\Sigma_{\mu=0}^{3}(N_{cells,source}^{DL,sTRP,\mu}++ r_{source} \cdot N_{cells,source}^{DL,mTRP,\mu}) \leq N_{cells,source}^{cap}$, the method 900 may proceed to block 920. If $\Sigma_{\mu=0}^{3}(N_{cells,source}^{DL,sTRP,\mu}+ r_{source} \cdot N_{cells,source}^{DL,mTRP,\mu}) > N_{cells,source}^{cap}$, the method 900 may proceed to block 940.

In block 920, the method 900 may include determining the per cell limit for each cell without CORESET grouping or with one CORESET group with a given SCS as a value equal to a lookup value of a serving cell with the same SCS for the source cell group. For example, the limit component 143 may determine the per cell limit for each cell without CORESET grouping or with one CORESET group with a given SCS as a value equal to a lookup value of a serving cell with the same SCS for the source cell group. That is, the limit of PDCCH candidates per scheduled cell for cells configured without CORESET grouping or with one CORESET group may be $M_{PDCCH,source}^{max,slot,\mu}$ the limit of non-overlapped CCEs per scheduled cell for cells configured without CORESET grouping or with one CORESET group may be $C_{PDCCH,source}^{max,slot,\mu}$. In some implementations, the lookup values may be obtained from the tables 10.1-2 and 10.1-3 above. For example, in a first implementation, the value $M_{PDCCH,source}^{max,slot,\mu}$ may be equal to the value of $M_{PDCCH}^{max,slot,\mu}$. In another implementation, the $M_{PDCCH}^{max,slot,\mu}$ may be split between the source cell group and the target cell group. That is, a sum of the lookup value for a serving cell with the same SCS for the source group and a lookup value for a serving cell with the same SCS for the target group is equal to the lookup value for a serving cell with the same SCS. Written symbolically, $M_{PDCCH}^{max,slot,\mu}=M_{PDCCH,source}^{max,slot,\mu}+ M_{PDCCH,target}^{max,slot,\mu}$. In another implementation, $M_{PDCCH,source}^{max,slot,\mu}$ may be based on a priority factor such as a 526. That is $M_{PDCCH,source}^{max,slot,\mu}= \alpha \cdot M_{PDCCH}^{max,slot,\mu}$.

In block 930, the method 900 may include determining the per cell limit for each cell with two CORESET groups as a multiple factor for the source cell group multiplied by a value equal to the lookup value for a serving cell with the same SCS for the source cell group. For example, the limit component 143 may determine the per cell limit for each cell with two CORESET groups as a multiple factor for the source cell group multiplied by a value equal to the lookup value for a serving cell with the same SCS for the source cell group. That is, for the source cell group, the limit of PDCCH candidates per scheduled cell for cells configured with two CORESET groups may be $r_{source} M_{PDCCH,source}^{max,slot,\mu}$ and the limit of non-overlapped CCEs per scheduled cell for cells configured with two CORESET groups may be $r_{source} C_{PDCCH,source}^{max,slot,\mu}$.

In block 940, the method 900 may include determining a source cell group monitoring limit for a given SCS as a function of the source blind decode capability and the lookup value of a serving cell with the same SCS for the source cell group. For instance, the limit component 143 may determine the source cell group monitoring limit for a given SCS as a function of the source blind decode capability and the lookup value of a serving cell with the same SCS for the source cell group. In some implementations, the function may be a floor of the blind decode capability for the source cell group times the lookup value for a serving cell with the same SCS for the source group multiplied by a ratio of a calculated number of cells with the same SCS in the source cell group and the calculated number of cells over all configured SCSs in the source cell group as:

$$M_{PDCCH}^{total,slot,\mu} =$$

$$\left\lfloor N_{cells,source}^{cap} \cdot M_{PDCCH,source}^{max,slot,\mu} \frac{\left(N_{cells,source}^{DL,sTRP,\mu} + r_{source} \cdot N_{cells,source}^{DL,mTRP,\mu}\right)}{\sum_{j=0}^{3}\left(N_{cells,source}^{DL,sTRP,j} + r_{source} \cdot N_{cells,source}^{DL,mTRP,j}\right)} \right\rfloor$$

Similarly, the limit component 143 may determine the source cell group monitoring limit of non-overlapped CCEs for all downlink cells with a given SCS as:

$$C_{PDCCH,source}^{total,slot,\mu} =$$

$$\left\lfloor N_{cells,source}^{cap} \cdot C_{PDCCH,source}^{max,slot,\mu} \frac{\left(N_{cells,source}^{DL,sTRP,\mu} + r_{source} \cdot N_{cells,source}^{DL,mTRP,\mu}\right)}{\sum_{j=0}^{3}\left(N_{cells,source}^{DL,sTRP,j}\left(r_{source} \cdot N_{cells,source}^{DL,mTRP,j}\right)\right)} \right\rfloor$$

In some implementations, the source blind decode capability may be derived from the total decode capability using a ratio of the calculated number of cells on the source cell group to the calculated total number of cells for the source cell group and the target cell group. For example, the source blind decode capability may be determined as:

$$N_{cells,source}^{cap} = N_{cells}^{cap} \frac{\sum_{\mu=0}^{3}\left(N_{cells,source}^{DL,sTRP,\mu}\right) + \left(r_{source} \cdot N_{cells,source}^{DL,mTRP,\mu}\right)}{\sum_{\mu=0}^{3}\left[\left(N_{cells,source}^{DL,sTRP,\mu} + N_{cells,target}^{DL,sTRP,\mu}\right) + \left(r_{source} \cdot N_{cells,source}^{DL,mTRP,\mu} + r_{target} \cdot N_{cells,target}^{DL,mTRP,\mu}\right)\right]}$$

In such implementations, the total source cell group monitoring limit may be expressed as:

$$M_{PDCCH,source}^{total,slot,\mu} = \left\lfloor N_{cells}^{cap} \cdot M_{PDCCH,source}^{max,slot,\mu} \right.$$

$$\left. \frac{\left(N_{cells,source}^{DL,sTRP,\mu} + r_{source} \cdot N_{cells,source}^{DL,mTRP,\mu}\right)}{\sum_{\mu=0}^{3}\left[\left(N_{cells,source}^{DL,sTRP,\mu} + N_{cells,target}^{DL,sTRP,\mu}\right) + \left(r_{source} \cdot N_{cells,source}^{DL,mTRP,\mu} + r_{target} \cdot N_{cells,target}^{DL,mTRP,\mu}\right)\right]} \right\rfloor$$

$$N_{cells,source}^{cap} = \lambda_{source} \cdot N_{cells}^{cap}, N_{cells,target}^{cap} = \lambda_{target} \cdot N_{cells}^{cap}, \text{ and}$$

$$\lambda_{source} = 1 - \lambda_{target}.$$

In such implementations, the total source cell group monitoring limit may be expressed as:

$$M_{PDCCH,source}^{total,slot,\mu} =$$

$$\left\lfloor N_{cells,source}^{cap} \cdot \lambda_{source} M_{PDCCH,source}^{max,slot,\mu} \frac{\left(N_{cells,source}^{DL,sTRP,\mu} + r_{source} \cdot N_{cells,source}^{DL,mTRP,\mu}\right)}{\sum_{j=0}^{3}\left(N_{cells,source}^{DL,sTRP,j} + r_{source} \cdot N_{cells,source}^{DL,mTRP,j}\right)} \right\rfloor$$

In block 950, the method 900 may include determining the per cell limit for each cell without CORESET grouping or with one CORESET group of the source cell group with a given SCS as a minimum of the source cell group monitoring limit for the given SCS and the lookup value of a serving cell with the same SCS. For instance, the limit component 143 may determine the per cell limit for cells without CORESET grouping or with one CORESET group as $\min(M_{PDCCH,source}^{max,slot,\mu}, M_{PDCCH,source}^{total,slot,\mu})$ and determine the per cell limit of non-overlapped CCEs as $\min(C_{PDCCH,source}^{max,slot,\mu}, C_{PDCCH,source}^{total,slot,\mu})$.

In block 960, the method 900 may include determining the per cell limit for each cell with two CORESET groups of the source cell group with a given SCS as a minimum of the source cell group monitoring limit for the given SCS of the cell with two CORESET groups and a multiple factor for the source cell group multiplied the lookup value of a serving cell with the same SCS for the source group. For instance, the limit component 143 may determine the per cell limit of PDCCH candidates for cells with two CORESET groups as $\min(r_{source} M_{PDCCH,source}^{max,slot,\mu}, M_{PDCCH,source}^{total,slot,\mu})$ and determine the per cell limit of non-overlapped CCEs as $\min(r_{source} C_{PDCCH,source}^{max,slot,\mu}, C_{PDCCH,source}^{total,slot,\mu})$.

Figure 10:
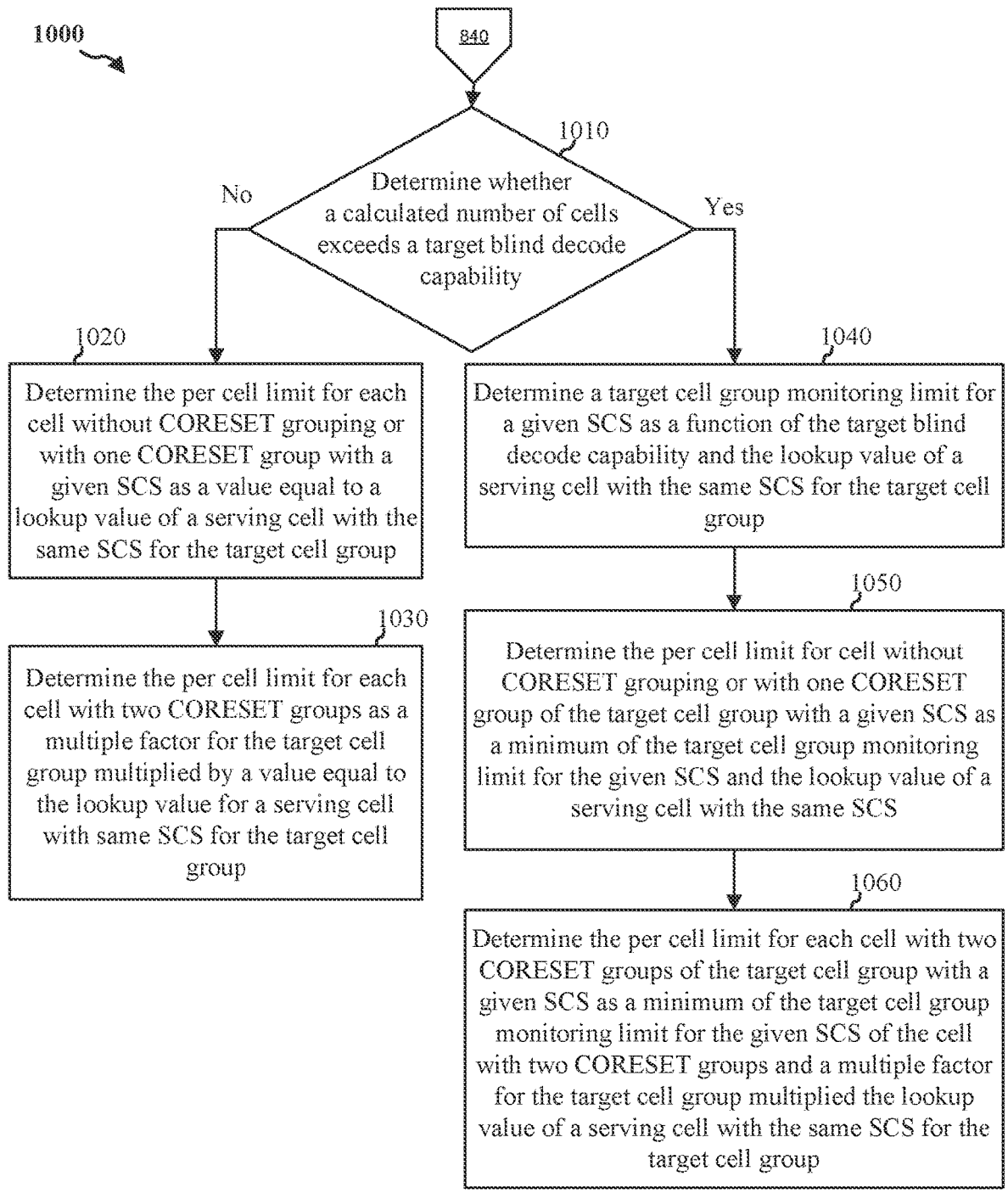
FIG. 10 shows a flowchart of an example method for determining per cell limits for a target cell group.

FIG. 10 shows a flowchart of an example method 1000 for determining per cell limits for a target cell group. The method 1000 may be performed by a UE (such as the UE 104, which may include the memory 360 and which may be the entire UE 104 or a component of the UE 104 such as the PDCCH limit component 140, TX processor 368, the RX processor 356, or the controller/processor 359) for determining a target cell group monitoring limit and per cell monitoring limits. In some implementations, the method 1000 may correspond to the block 840 of the method 800. The method 1000 may be performed by the limit component 143.

At decision block 1010, the method 1000 may include determining whether the calculated number of cells for the target cell group exceeds a target blind decode capability. The calculated number of serving cells may be determined based on configured cells for each SCS μ. For example, $N_{cells,sTRP}^{DL,\mu}$ and $N_{cells,mTRP}^{DL,\mu}$ representing the number of downlink cells that the UE 104 is configured with single TRP and multi-TRP operation, respectively, and having active downlink BWP with SCS μ. Accordingly, in the case of 4 maximum downlink BWP, the calculated number of serving cells may be expressed as $\Sigma_{\mu=0}^{3} (N_{cells,target}^{DL,sTRP,\mu} + r_{target} \cdot N_{cells,target}^{DL,mTRP,\mu})$ That is, the limit component 143 may determine whether the number of configured downlink serving cells without CORESET grouping or with one CORESET group in the target cell group plus the multiple factor for the target cell group multiplied by the number of configured downlink serving cells with two CORESET groups in the target cell group is less than or equal to the $Ncap_{target}$. If $\Sigma_{\mu=0}^{3} (N_{cells,target}^{DL,sTRP,\mu} + r_{target} \cdot N_{cells,target}^{DL,mTRP,\mu}) \leq N_{cells,target}^{cap}$ the method 1000 may proceed to block 1020.

If $\sum_{\mu=0}^{3}(N_{cells,target}^{DL,sTRP,\mu}+r_{target}\cdot N_{cells,target}^{DL,mTRP,\mu})>N_{cells,target}^{cap}$, the method 1000 may proceed to block 1040.

In block 1020, the method 1000 may include determining the per cell limit for each cell without CORESET grouping or with one CORESET group with a given SCS as a value equal to a lookup value of a serving cell with the same SCS for the target cell group. For example, the limit component 143 may determine the per cell limit for each cell without CORESET grouping or with one CORESET group with a given SCS as a value equal to a lookup value of a serving cell with the same SCS for the target cell group. That is, the limit of PDCCH candidates per scheduled cell for cells without CORESET grouping or with one CORESET group may be $M_{PDCCH,target}^{max,slot,\mu}$ and the limit of non-overlapped CCEs per scheduled cell for cells configured without CORESET grouping or with one CORESET group may be $C_{PDCCH,target}^{max,slot,\mu}$.

In block 1030, the method 1000 may include determining the per cell limit for each cell with two CORESET groups as a multiple factor for the target cell group multiplied by a value equal to the lookup value for a serving cell with the same SCS for the target cell group. For example, the limit component 143 may determine the per cell limit for each cell with two CORESET groups as a multiple factor for the target cell group multiplied by a value equal to the lookup value for a serving cell with the same SCS for the target cell group. That is, for the target cell group, the limit of PDCCH candidates per scheduled cell for cells configured with two CORESET groups may be $r_{target}M_{PDCCH,target}^{max,slot,\mu}$ and the limit of non-overlapped CCEs per scheduled cell for cells configured with two CORESET groups may be $r_{target}C_{PDCCH,target}^{max,slot,\mu}$.

In block 1040, the method 1000 may include determining a target cell group monitoring limit for a given SCS as a function of the target blind decode capability and the lookup value of a serving cell with the same SCS for the target cell group. For instance, the limit component 143 may determine the target cell group monitoring limit for a given SCS as a function of the target blind decode capability and the lookup value of a serving cell with the same SCS for the target cell group. In some implementations, the function may be a floor of the blind decode capability for the target cell group times the lookup value for a serving cell with the same SCS for the target group multiplied by a ratio of a calculated number of cells with the same SCS in the target cell group and the calculated number of cells over all configured SCSs in the target cell group as:

$$M_{PDCCH,target}^{total,slot,\mu} = \left\lfloor N_{cells,target}^{cap} \cdot M_{PDCCH,target}^{max,slot,\mu} \frac{(N_{cells,target}^{DL,sTRP,\mu}+r_{target}\cdot N_{cells,target}^{DL,mTRP,\mu})}{\sum_{j=0}^{3}(N_{cells,target}^{DL,sTRP,j}+r_{target}\cdot N_{cells,target}^{DL,mTRP,j})} \right\rfloor$$

Similarly, the limit component 143 may determine the target cell group monitoring limit of non-overlapped CCEs for all downlink cells with a given SCS as:

$$C_{PDCCH,target}^{total,slot,\mu} = \left\lfloor N_{cells,target}^{cap} \cdot C_{PDCCH,target}^{max,slot,\mu} \frac{(N_{cells,target}^{DL,sTRP,\mu}+r_{target}\cdot N_{cells,target}^{DL,mTRP,\mu})}{\sum_{j=0}^{3}(N_{cells,target}^{DL,sTRP,j}+(r_{target}\cdot N_{cells,target}^{DL,mTRP,j}))} \right\rfloor$$

In some implementations, the target blind decode capability may be derived from the total decode capability using a ratio of the calculated number of cells on the source cell group to the calculated total number of cells for the source cell group and the target cell group. For example, the source blind decode capability may be determined as:

$$N_{cells,target}^{cap} = N_{cells}^{cap} \frac{\sum_{\mu=0}^{3}(N_{cells,target}^{DL,sTRP,\mu})+(r_{target}\cdot N_{cells,target}^{DL,mTRP,\mu})}{\sum_{\mu=0}^{3}[(N_{cells,source}^{DL,sTRP,\mu}+N_{cells,target}^{DL,sTRP,\mu})+(r_{source}\cdot N_{cells,source}^{DL,mTRP,\mu}+r_{target}\cdot N_{cells,target}^{DL,mTRP,\mu})]}$$

In such implementations, the total source cell group monitoring limit may be expressed as:

$$M_{PDCCH,target}^{total,slot,\mu} = \left\lfloor N_{cells}^{cap} \cdot M_{PDCCH,target}^{max,slot,\mu} \frac{(N_{cells,target}^{DL,sTRP,\mu}+r_{target}\cdot N_{cells,target}^{DL,mTRP,\mu})}{\sum_{\mu=0}^{3}[(N_{cells,source}^{DL,sTRP,\mu}+N_{cells,target}^{DL,sTRP,\mu})+(r_{source}\cdot N_{cells,source}^{DL,mTRP,\mu}+r_{target}\cdot N_{cells,target}^{DL,mTRP,\mu})]} \right\rfloor$$

In some implementations, the source blind decode may be derived from the total decode capability based on the priority $\lambda$ between source and target cells. For example, $$N_{cells,source}^{cap} = \lambda_{source}\cdot N_{cells}^{cap},\ N_{cells,target}^{cap} = \lambda_{target}\cdot N_{cells}^{cap},$$

and $\lambda_{source} = 1 - \lambda_{target}$.

In such implementations, the total source cell group monitoring limit may be expressed as:

$$M_{PDCCH,target}^{total,slot,\mu} =$$

$$\left[ N_{cells,target}^{cap} \cdot \lambda_{target} M_{PDCCH,target}^{max,slot,\mu} \frac{\left(N_{cells,target}^{DL,sTRP,\mu} + r_{target} \cdot N_{cells,target}^{DL,mTRP,\mu}\right)}{\sum_{j=0}^{3} \left(N_{cells,target}^{DL,sTRP,j} + r_{target} \cdot N_{cells,target}^{DL,mTRP,j}\right)} \right]$$

In block 1050, the method 1000 may include determining the per cell limit for each cell without CORESET grouping or with one CORESET group of the target cell group with a given SCS as a minimum of the target cell group monitoring limit for the given SCS and the lookup value of serving cell with the same SCS. For instance, the limit component 143 may determine the per cell limit for cells without CORESET grouping or with one CORESET group as $\min(M_{PDCCH,target}^{max,slot,\mu}, M_{PDCCH,target}^{total,slot,\mu})$ and determine the per cell limit of non-overlapped CCEs as $\min(M_{PDCCH,target}^{max,slot,\mu}, M_{PDCCH,target}^{total,slot,\mu})$.

In block 1060, the method 1000 may include determining the per cell limit for each cell with two CORESET groups of the target cell group with a given SCS as a minimum of the target cell group monitoring limit for the given SCS of the cell with two CORESET groups and a multiple factor for the target cell group multiplied the lookup value of a serving cell with the same SCS for the target group. For instance, the limit component 143 may determine the per cell limit of PDCCH candidates for cells with two CORESET groups as $\min(r_{target}M_{PDCCH,target}^{max,slot,\mu}, M_{PDCCH,target}^{total,slot,\mu})$ and determine the per cell limit of non-overlapped CCEs as $\min(r_{target}C_{PDCCH,target}^{max,slot,\mu}, C_{PDCCH,target}^{total,slot,\mu})$.

Figure 11:
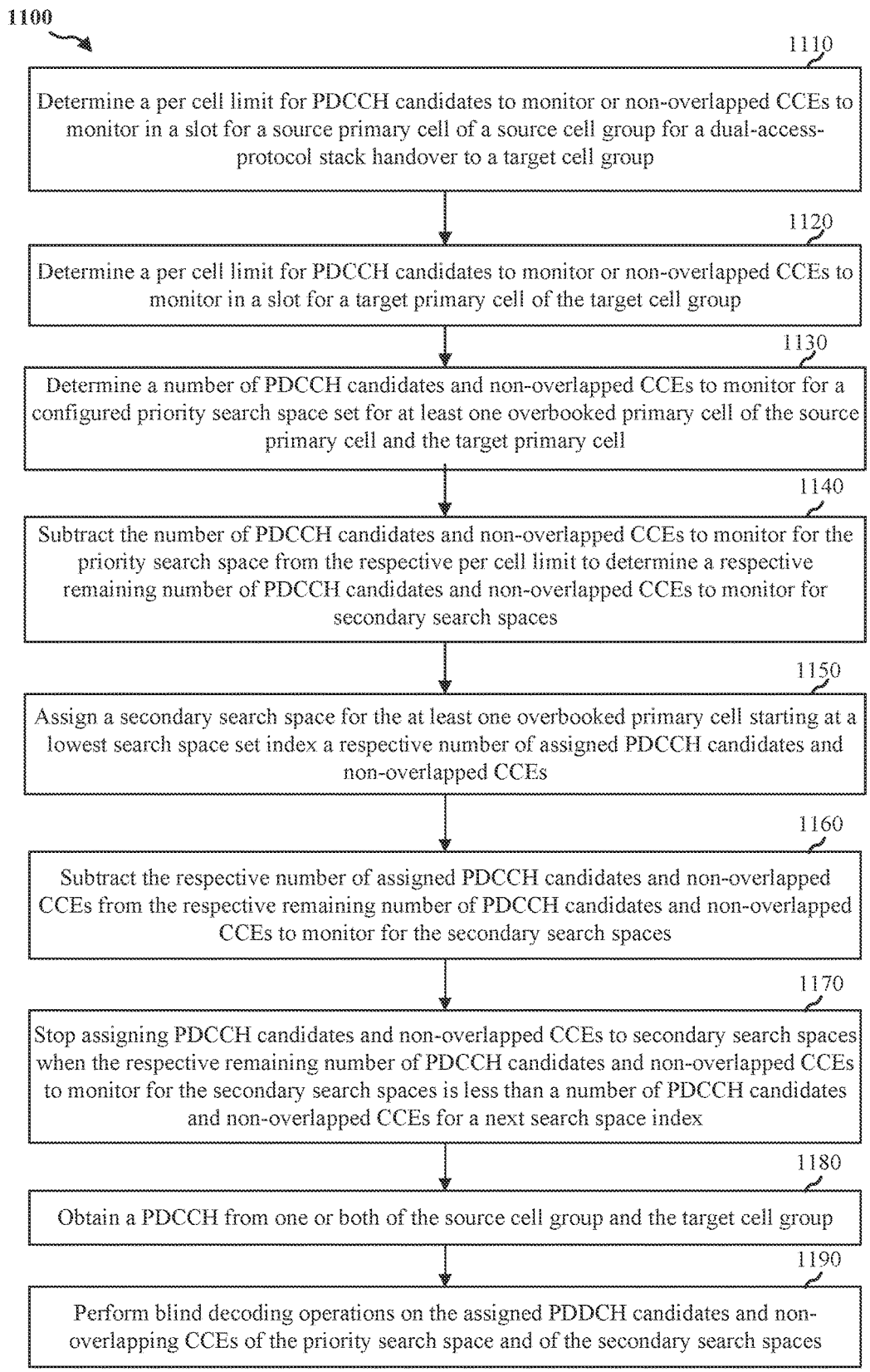
FIG. 11 shows a flowchart of an example method for applying PDCCH decoding limits in an overbooking scenario.

FIG. 11 shows a flowchart of a third example method 1100 for applying PDCCH decoding limits in an overbooking scenario. The method 1100 may be performed by a UE (such as the UE 104, which may include the memory 360 and which may be the entire UE 104 or a component of the UE 104 such as the PDCCH limit component 140, TX processor 368, the RX processor 356, or the controller/processor 359) for performing overbooking. In some implementations, the method 1100 may be performed by the overbooking component 144.

In block 1110, the method 1100 may include determining a per cell limit for PDCCH candidates or non-overlapped CCEs to monitor in a slot for a source primary cell of a source cell group for a dual-access-protocol stack handover to a target cell group. In some implementations, for example, the UE 104 or the controller/processor 359 may execute the PDCCH limit component 140 or the limit component 143 to determine the per cell limit for PDCCH candidates or non-overlapped CCEs to monitor in the slot for the source primary cell of the source cell group for the dual-access-protocol stack handover to the target cell group. For instance, the limit component 143 may determine the per cell limit for the source primary cell as discussed above with respect to FIG. 7 and FIG. 9. Accordingly, the UE 104 or the controller/processor 359 executing the PDCCH limit component 140 or the limit component 143 may provide means for determining a per cell limit for PDCCH candidates or non-overlapped CCEs to monitor in a slot for a source primary cell of a source cell group for a dual-access-protocol stack handover to a target cell group.

In block 1120, the method 1100 may include determining a per cell limit for PDCCH candidates or non-overlapped CCEs to monitor in a slot for a target primary cell of the target cell group. In some implementations, for example, the UE 104 or the controller/processor 359 may execute the PDCCH limit component 140 or the limit component 143 to determine the per cell limit for PDCCH candidates or non-overlapped CCEs to monitor in the slot for the target primary cell of the target cell group. For instance, the limit component 143 may determine the per cell limit for the target primary cell as discussed above with respect to FIG. 7 and FIG. 10.

In block 1130, the method 1100 may include determining a number of PDCCH candidates and non-overlapped CCEs to monitor for a configured priority search space set for at least one overbooked primary cell of the source primary cell and the target primary cell. In some implementations, for example, the UE 104 or the controller/processor 359 may execute the PDCCH limit component 140 or the overbooking component 144 to determine the number of PDCCH candidates and non-overlapped CCEs to monitor for a configured priority search space set for at least one overbooked primary cell of the source primary cell and the target primary cell. The at least one overbooked primary cell may be only the source primary cell, only the target primary cell, or both of the source primary cell and the target primary cell. In some implementations, even if both of the source primary cell and the target primary cell are overbooked, the overbooking component 144 may select one of the source primary cell and the target primary cell as a single overbooked primary cell based on a priority. The priority may be selected by the UE, requested by the UE, or configured by the network. For example, the UE 104 may receive an indication of the priority in a dual-access-protocol stack handover command. Generally, in the case of overbooking, the PDCCH candidates and CCEs for the common search spaces may be mandatory and count toward the per cell limit. In the case of a DAPS handover, however, the user search space may be prioritized, which may facilitate the handover. Accordingly, the priority search space set may be the common search space or the UE specific search space. The priority search space may be indicated in a DAPS handover command. In some implementations, the overbooking component 144 may determine the number of blind decoding operations (PDCCH candidates to monitor) as $M_{PDCCH} = \sum_{i=0}^{I-1} \sum_L M_{S(i)}^{(L)}$, where L is the number of index for aggregation level, I is the cardinality of the priority search space, and S(i) is the search space with index i. Similarly, overbooking component 144 may determine the number of non-overlapping CCEs for the priority search space as $C_{PDCCH} = \sum_{i=0}^{I-1} \sum_L C_{S(i)}^{(L)}$. In some implementations, when the priority search space set is the UE specific search space set, the overbooking component 144 may be configured to determine a number of blind decoding operations and non-overlapped CCEs to monitor for the configured priority search space set based on a limit for the UE specific search space set that is less than the respective per cell limit. Therefore, some blind decoding operations and non-overlapped CCEs may be reserved for the common search space set. Accordingly, the UE 104 or the controller/processor 359 executing the PDCCH limit component 140 or the overbooking component 144 may provide means for determining a number of PDCCH candidates and non-overlapped CCEs to monitor for a configured priority search space set for at least one overbooked primary cell of the source primary cell and the target primary cell.

In block 1140, the method 1100 may include subtracting the number of PDCCH candidates and non-overlapped CCEs to monitor for the priority search space from the respective per cell limit to determine a respective remaining number of blind decoding operations and non-overlapped CCEs to monitor for secondary search spaces. In some implementations, for example, the UE 104 or the controller/processor 359 may execute the PDCCH limit component 140 or the overbooking component 144 to subtract the number of PDCCH candidates and non-overlapped CCEs to monitor for the priority search space from the respective per cell limit to determine a respective remaining number of blind decoding operations and non-overlapped CCEs to monitor for secondary search spaces. Accordingly, the UE 104 or the controller/processor 359 executing the PDCCH limit component 140 or the overbooking component 144 may provide means for subtracting the number of PDCCH candidates and non-overlapped CCEs to monitor for the priority search space from the respective per cell limit to determine a respective remaining number of blind decoding operations and non-overlapped CCEs to monitor for secondary search spaces.

In block 1150, the method 1100 may include assigning a secondary search space for the at least one overbooked primary cell starting at a lowest search space set index a respective number of assigned PDCCH candidates and non-overlapped CCEs. In some implementations, for example, the UE 104 or the controller/processor 359 may execute the PDCCH limit component 140 or the overbooking component 144 to assign the secondary search space for the at least one overbooked primary cell starting at a lowest search space set index a respective number of assigned PDCCH candidates and non-overlapped CCEs. The number of assigned PDCCH candidates may be based on the aggregation level (L) and cardinality (I) of the secondary search space for the search space set index. The number of assigned non-overlapping CCEs may be based on the number of CCEs for the secondary search space for the search space set index. Accordingly, the UE 104 or the controller/processor 359 executing the PDCCH limit component 140 or the overbooking component 144 may provide means for assigning a secondary search space for the at least one overbooked primary cell starting at a lowest search space set index a respective number of assigned PDCCH candidates and non-overlapped CCEs.

In block 1160, the method 1100 may include subtracting the respective number of assigned PDCCH candidates and non-overlapped CCEs from the respective remaining number of PDCCH candidates and non-overlapped CCEs to monitor for the secondary search spaces. In some implementations, for example, the UE 104 or the controller/processor 359 may execute the PDCCH limit component 140 or the overbooking component 144 to subtract the respective number of assigned PDCCH candidates and non-overlapped CCEs from the respective remaining number of PDCCH candidates and non-overlapped CCEs to monitor for the secondary search spaces. Accordingly, the UE 104 or the controller/processor 359 executing the PDCCH limit component 140 or the overbooking component 144 may provide means for subtracting the respective number of assigned PDCCH candidates and non-overlapped CCEs from the respective remaining number of PDCCH candidates and non-overlapped CCEs to monitor for the secondary search spaces.

In block 1170, the method 1100 may include stopping the assigning of PDCCH candidates and non-overlapped CCEs to secondary search spaces when the respective remaining number of PDCCH candidates and non-overlapped CCEs to monitor for the secondary search spaces is less than a number of PDCCH candidates and non-overlapped CCEs for a next search space index. In some implementations, for example, the UE 104 or the controller/processor 359 may execute the PDCCH limit component 140 or the overbooking component 144 to stop assigning PDCCH candidates and non-overlapped CCEs to secondary search spaces when the respective remaining number of PDCCH candidates and non-overlapped CCEs to monitor for the secondary search spaces is less than a number of PDCCH candidates and non-overlapped CCEs for a next search space index. Accordingly, the UE 104 or the controller/processor 359 executing the PDCCH limit component 140 or the overbooking component 144 may provide means for stopping the assigning of PDCCH candidates and non-overlapped CCEs to secondary search spaces when the respective remaining number of PDCCH candidates and non-overlapped CCEs to monitor for the secondary search spaces is less than a number of PDCCH candidates and non-overlapped CCEs for a next search space index.

In block 1180, the method 1100 may include obtaining a PDCCH from at least one of the source cell group and the target cell group. In some implementations, for example, the UE 104, or the controller/processor 359 may execute the PDCCH limit component 140 or the decoding component 145 to obtain a PDCCH from at least one of the source cell group and the target cell group. Accordingly, the UE 104, RX processor 356 or the controller/processor 359 executing the PDCCH limit component 140 or the decoding component 145 may provide means for obtaining a PDCCH from at least one of the source cell group and the target cell group.

In block 1190, the method 1100 may include performing blind decoding operations on PDCCH candidates and CCEs up to the per cell monitoring limit for each cell. In some implementations, for example, the UE 104, or the controller/processor 359 may execute the PDCCH limit component 140 or the decoding component 145 to perform blind decoding operations on PDCCH candidates and CCEs up to the per cell monitoring limit for each cell. Accordingly, the UE 104, RX processor 356 or the controller/processor 359 executing the PDCCH limit component 140 or the decoding component 145 may provide means for performing blind decoding operations on PDCCH candidates and CCEs up to the per cell monitoring limit for each cell.

Figure 12:
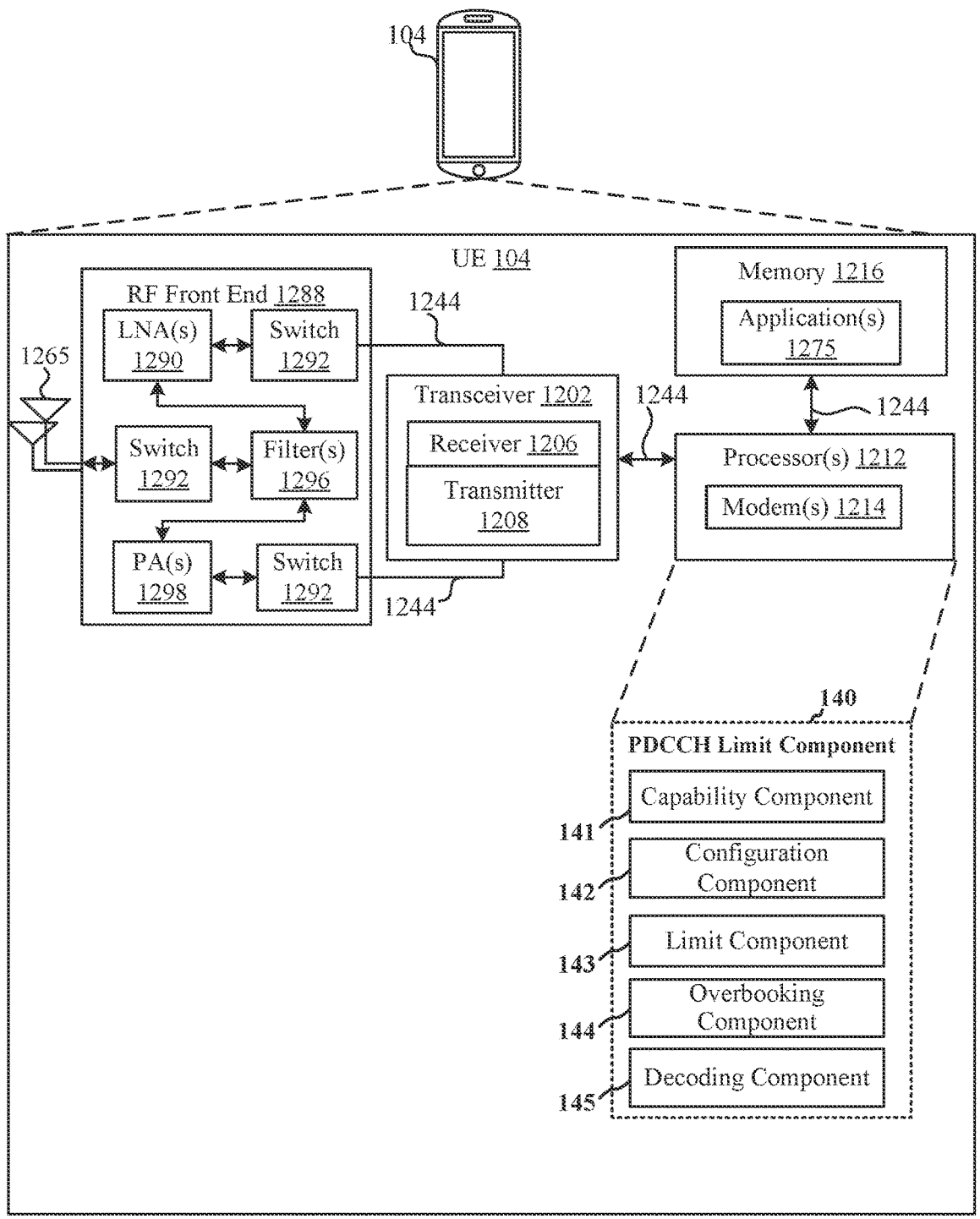
FIG. 12 shows a schematic diagram of example components of the UE of FIG. 1.

FIG. 12 shows a schematic diagram of example components of the UE of FIG. 1. One example of an implementation of UE 104 may include a variety of components, some of which have already been described above, but including components such as one or more processors 1212 and memory 1216 and transceiver 1202 in communication via one or more buses 1244, which may operate in conjunction with modem 1214, and PDCCH limit component 140 to enable one or more of the functions described herein related to limits on PDCCH decoding. Further, the one or more processors 1212, modem 1214, memory 1216, transceiver 1202, RF front end 1288 and one or more antennas 1265 may be configured to support voice or data calls (simultaneously or non-simultaneously) in one or more radio access technologies. The antennas 1265 may include one or more antennas, antenna elements, or antenna arrays.

In some implementations, the one or more processors 1212 may include a modem 1214 that uses one or more modem processors. The various functions related to PDCCH limit component 140 may be included in modem 1214 or processors 1212 and, in some implementations, may be executed by a single processor, while in other aspects, different ones of the functions may be executed by a combination of two or more different processors. For example, in some implementations, the one or more processors 1212 may include any one or any combination of a modem processor, or a baseband processor, or a digital signal processor, or a transmit processor, or a receiver processor, or a transceiver processor associated with transceiver 1202. In other aspects, some of the features of the one or more processors 1212 or modem 1214 associated with PDCCH limit component 140 may be performed by transceiver 1202.

Also, memory 1216 may be configured to store data used herein or local versions of applications 1275, PDCCH limit component 140 or one or more of subcomponents thereof being executed by at least one processor 1212. Memory 1216 may include any type of computer-readable medium usable by a computer or at least one processor 1212, such as random access memory (RAM), read only memory (ROM), tapes, magnetic discs, optical discs, volatile memory, non-volatile memory, and any combination thereof. In some implementations, for example, memory 1216 may be a non-transitory computer-readable storage medium that stores one or more computer-executable codes defining PDCCH limit component 140 or one or more of subcomponents thereof, or data associated therewith, when UE 104 is operating at least one processor 1212 to execute PDCCH limit component 140 or one or more subcomponents thereof.

Transceiver 1202 may include at least one receiver 1206 and at least one transmitter 1208. Receiver 1206 may include hardware, firmware, or software code executable by a processor for receiving data, the code including instructions and being stored in a memory (such as a computer-readable medium). Receiver 1206 may be, for example, a radio frequency (RF) receiver. In some implementations, receiver 1206 may receive signals transmitted by at least one base station 102. Additionally, receiver 1206 may process such received signals, and also may obtain measurements of the signals, such as, but not limited to, Ec/Io, SNR, RSRP, RSSI, etc. Transmitter 1208 may include hardware, firmware, or software code executable by a processor for transmitting data, the code including instructions and being stored in a memory (such as a computer-readable medium). A suitable example of transmitter 1208 may including, but is not limited to, an RF transmitter.

Moreover, in some implementations, UE 104 may include RF front end 1288, which may operate in communication with one or more antennas 1265 and transceiver 1202 for receiving and transmitting radio transmissions, for example, wireless communications transmitted by at least one base station 102 or wireless transmissions transmitted by UE 104. RF front end 1288 may be connected to one or more antennas 1265 and may include one or more low-noise amplifiers (LNAs) 1290, one or more switches 1292, one or more power amplifiers (PAs) 1298, and one or more filters 1296 for transmitting and receiving RF signals.

In some implementations, LNA 1290 may amplify a received signal at a desired output level. In some implementations, each LNA 1290 may have a specified minimum and maximum gain values. In some implementations, RF front end 1288 may use one or more switches 1292 to select a particular LNA 1290 and its specified gain value based on a desired gain value for a particular application.

Further, for example, one or more PA(s) 1298 may be used by RF front end 1288 to amplify a signal for an RF output at a desired output power level. In some implementations, each PA 1298 may have specified minimum and maximum gain values. In some implementations, RF front end 1288 may use one or more switches 1292 to select a particular PA 1298 and its specified gain value based on a desired gain value for a particular application.

Also, for example, one or more filters 1296 may be used by RF front end 1288 to filter a received signal to obtain an input RF signal. Similarly, in some implementations, for example, a respective filter 1296 may be used to filter an output from a respective PA 1298 to produce an output signal for transmission. In some implementations, each filter 1296 may be connected to a specific LNA 1290 or PA 1298. In some implementations, RF front end 1288 may use one or more switches 1292 to select a transmit or receive path using a specified filter 1296, LNA 1290, or PA 1298, based on a configuration as specified by transceiver 1202 or processor 1212.

As such, transceiver 1202 may be configured to transmit and receive wireless signals through one or more antennas 1265 via RF front end 1288. In some implementations, transceiver 1202 may be tuned to operate at specified frequencies such that UE 104 can communicate with, for example, one or more base stations 102 or one or more cells associated with one or more base stations 102. In some implementations, for example, modem 1214 may configure transceiver 1202 to operate at a specified frequency and power level based on the UE configuration of the UE 104 and the communication protocol used by modem 1214.

In some implementations, modem 1214 may be a multi-band-multimode modem, which can process digital data and communicate with transceiver 1202 such that the digital data is sent and received using transceiver 1202. In some implementations, modem 1214 may be multiband and be configured to support multiple frequency bands for a specific communications protocol. In some implementations, modem 1214 may be multimode and be configured to support multiple operating networks and communications protocols. In some implementations, modem 1214 may control one or more components of UE 104 (such as RF front end 1288, transceiver 1202) to enable transmission or reception of signals from the network based on a specified modem configuration. In some implementations, the modem configuration may be based on the mode of the modem and the frequency band in use. In another aspect, the modem configuration may be based on UE configuration information associated with UE 104 as provided by the network during cell selection or cell reselection.

Figure 13:
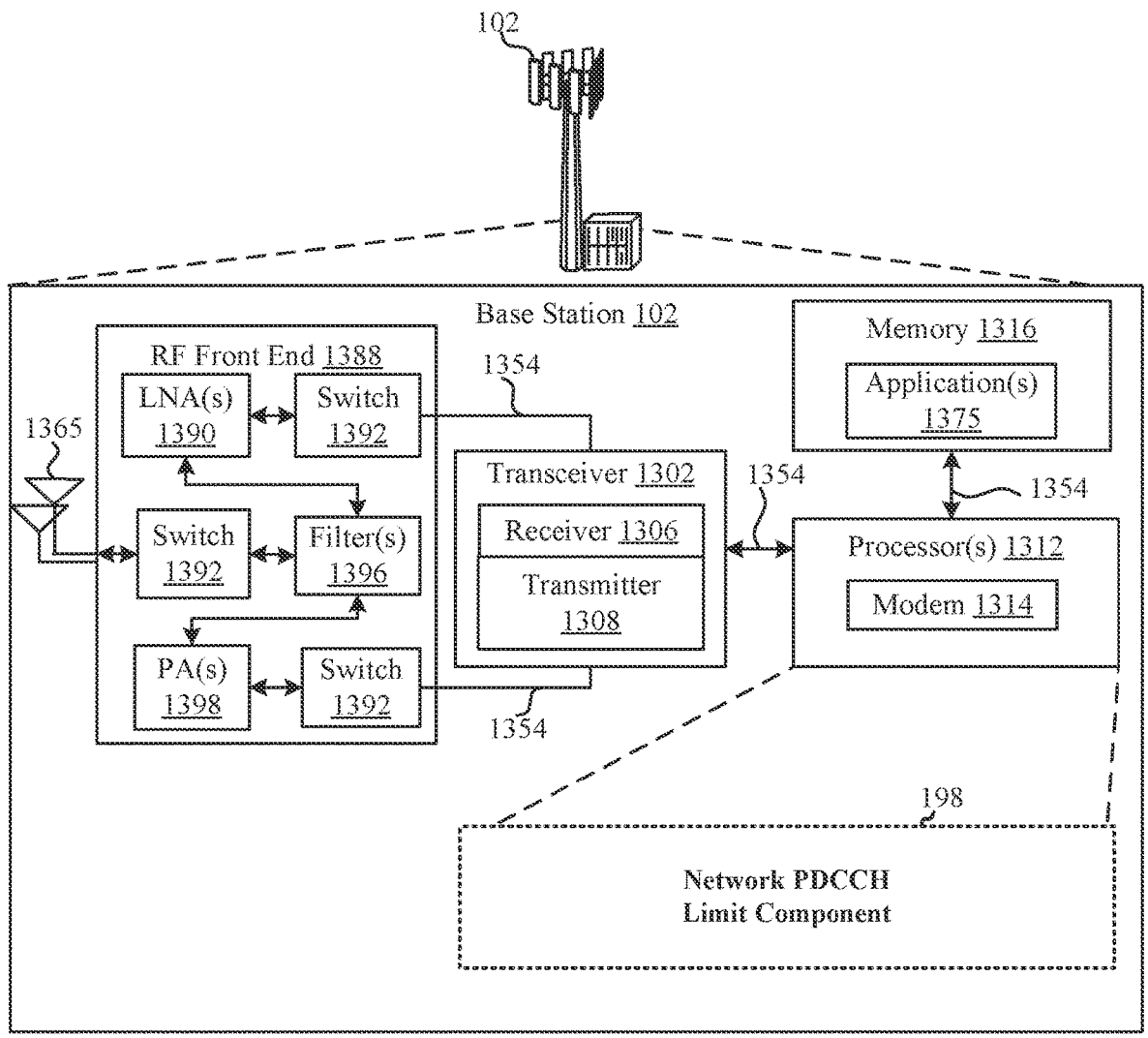
FIG. 13 shows a schematic diagram of example components of the base station of FIG. 1.

FIG. 13 shows a schematic diagram of example components of the base station of FIG. 1. One example of an implementation of base station 102 may include a variety of components, some of which have already been described above, but including components such as one or more processors 1312 and memory 1316 and transceiver 1302 in communication via one or more buses 1354, which may operate in conjunction with modem 1314 and network PDCCH limit component 198 to enable one or more of the functions described herein related to PDCCH limits.

The transceiver 1302, receiver 1306, transmitter 1308, one or more processors 1312, memory 1316, applications 1375, buses 1354, RF front end 1388, LNAs 1390, switches 1392, filters 1396, PAs 1398, and one or more antennas 1365 may be the same as or similar to the corresponding components of UE 104, as described above, but configured or otherwise programmed for base station operations as opposed to UE operations.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
a processing system configured to:
    determine whether a calculated total number of cells over all configured sub-carrier spacings (SCSs) of a source cell group and a target cell group during a dual active protocol stack (DAPS) handover exceeds a joint blind decode capability;
    identify, based on the determination and a SCS of each cell, a per cell limit for physical downlink control channel (PDCCH) candidates to monitor, or non-overlapped control channel elements (CCEs) to monitor
    in a slot for
        each cell without control resource set (CORESET) grouping or with one CORESET group, and
        each cell with two CORESET groups if configured for the source cell group and the target cell group; and
    perform blind decoding operations on PDCCH candidates and CCEs up to the per cell monitoring limit for each cell; and a first interface configured to obtain a PDCCH from at least one of the source cell group and the target cell group.

2. The apparatus of claim 1, wherein the calculated total number of cells for the source cell group and the target cell group for a given SCS, is a number of cells without CORESET grouping or with one CORESET group in the source cell group and in the target cell group with the same SCS plus a multiple factor for the source cell group times a number of cells with two CORESET groups in the source cell group with the same SCS plus a multiple factor for the target cell group times a number of cells with two CORESET groups in the target cell group with the same SCS.

3. The apparatus of claim 1, wherein the calculated total number of cells over all configured SCSs for the source cell group and the target cell group is less than or equal to the joint blind decode capability and wherein the processing system is configured to identify the per cell limit by:
 determining the per cell limit for each cell without CORESET grouping or with one CORESET group with a given SCS as a value equal to a lookup value of a serving cell with the same SCS; and
 determining the per cell limit for each cell with two CORESET groups with a given SCS as a multiple factor for the respective cell group multiplied by a lookup value of a serving cell with same SCS.

4. The apparatus of claim 1, wherein the calculated total number of cells over all configured SCSs for the source cell group and the target cell group is greater than the joint blind decode capability and wherein the processing system is configured to identify the per cell limit by:
 determining a total monitoring limit for a given SCS as a function of the joint blind decode capability and a lookup value of a serving cell with the same SCS;
 determining the per cell limit for each cell without CORESET grouping or with one CORESET group with a given SCS as a minimum of the total monitoring limit for the given SCS and a lookup value of a serving cell with the same SCS;
 determining the per cell limit for each cell with two CORESET groups of the source cell group with a given SCS as a minimum of the total monitoring limit for the given SCS and a multiple factor for the source cell group multiplied the lookup value of a serving cell with the same SCS; and
 determining the per cell limit for each cell with two CORESET groups of the target cell group with a given SCS as a minimum of the total monitoring limit for the given SCS and a multiple factor for the target cell group multiplied by a lookup value of a serving cell with the same SCS.

5. The apparatus of claim 4, wherein the function is a floor of the joint blind decode capability times a lookup value of a serving cell with the same SCS multiplied by a ratio of the calculated number of cells with the same SCS in the source cell group and target cell group to the calculated total number of cells across all configured SCSs for the source cell group and the target cell group.

6. The apparatus of claim 1, wherein the joint blind decode capability for the source cell group and the target cell group is a capability reported by the apparatus or configured by a network.

7. An apparatus for wireless communication, comprising:
 a processing system configured to:
  determine whether a calculated number of cells over all configured sub-carrier spacings (SCSs) of a source cell group during a dual active protocol stack handover exceeds a blind decode capability for the source cell group;
  identify, based on the first determination and a sub-carrier spacing (SCS) of each cell in the source cell group, a per cell limit for
   physical downlink control channel (PDCCH) candidates to monitor, or
   non-overlapped control channel elements (CCEs) to monitor in a slot for
    each cell without control resource set (CORESET) grouping or with one CORESET group, and
    each cell with two CORESET groups if configured for the source cell group;
  determine whether a calculated number of cells for a target cell group during the dual active protocol stack handover exceeds a blind decode capability for the target cell group;
  identify, based on the second determination and a SCS of each cell in the target cell group, a per cell limit for
   PDCCH candidates to monitor, or
   non-overlapped CCEs to monitor
  in a slot for
   each cell without CORESET grouping or with one CORESET group, and
   each cell with two CORESET groups if configured for the target cell group; and
  perform blind decoding operations on PDCCH candidates and CCEs up to the per cell monitoring limit for each cell; and
 a first interface configured to obtain a PDCCH from at least one of the source cell group and the target cell group.

8. The apparatus of claim 7, wherein the calculated number of cells for the source cell group cell group for a given SCS is a number of cells without CORESET grouping or with one CORESET group with the same SCS in the source cell group plus a multiple factor for the source cell group times a number of cells with two CORESET groups with the same SCS in the source cell group and the calculated number of cells for a given SCS for the target cell group is a number of cells without CORESET grouping or with one CORESET group with the same SCS in the target cell group plus a multiple factor for the target cell group times a number of cells with two CORESET groups with the same SCS in the target cell group.

9. The apparatus of claim 7, wherein the calculated number of cells over configured SCSs for the source cell group is less than or equal to blind decode capability for the source cell group and wherein the processing system is configured to determine the per cell limit for the source cell group by:
 determining the per cell limit for each cell without CORESET grouping or with one CORESET group with a given SCS as a value equal to a lookup value of a serving cell with the same SCS for the source cell group; and
 determining the per cell limit for each cell with two CORESET groups as a multiple factor for the source cell group multiplied by a value equal to the lookup value for a serving cell with same SCS for the source cell group.

10. The apparatus of claim 7, wherein the calculated number of cells over all configured SCSs in the source cell group is greater than the blind decode capability for the source cell group and wherein the processing system is configured to determine the per cell limit for the source cell group by:

determining a source cell group monitoring limit for a given SCS as a function of the source blind decode capability and a lookup value of a serving cell with the same SCS for the source cell group;

determining the per cell limit for each cell without CORESET grouping or with one CORESET group of the source cell group with a given SCS as a minimum of the source cell group monitoring limit for the given SCS and the lookup value of a serving cell with the same SCS; and determining the per cell limit for each cell with two CORESET groups of the source cell group with a given SCS as a minimum of the source cell group monitoring limit for the given SCS of the cell with two CORESET groups and a multiple factor for the source cell group multiplied the lookup value of a serving cell with the same SCS for the source group.

11. The apparatus of claim 10, wherein the function is a floor of the blind decode capability for the source cell group times the lookup value for a serving cell with same SCS for the source group multiplied by a ratio of a calculated number of cells with the same SCS in the source cell group and the calculated number of cells over all configured SCSs in the source cell group.

12. The apparatus of claim 10, wherein the lookup value for a serving cell with the same SCS for the source group is equal to the lookup value for a serving cell with the same SCS.

13. The apparatus of claim 10, wherein a sum of the lookup value for a serving cell with the same SCS for the source group and a lookup value for a serving cell with the same SCS for the target group is equal to the lookup value for a serving cell with the same SCS.

14. The apparatus of claim 7, wherein the blind decode capability for the source cell group and the blind decode capability for the target cell group are based on separate capabilities reported by the apparatus.

15. The apparatus of claim 7, wherein the blind decode capability for the source cell group and the blind decode capability for the target cell group are configured by a network.

16. A method of wireless communication at an apparatus of a user equipment (UE), comprising:

determining whether a calculated total number of cells over all configured sub-carrier spacings (SCSs) of a source cell group and a target cell group during a dual active protocol stack handover exceeds a joint blind decode capability;

identifying, based on the determination and a SCS of each cell, a per cell limit for physical downlink control channel (PDCCH) candidates to monitor, or non-overlapped control channel elements (CCEs) to monitor in a slot for each cell without control resource set (CORESET) grouping or with one CORESET group, and each cell with two CORESET groups if configured for the source cell group and the target cell group; and obtaining a PDCCH from at least one of the source cell group and the target cell group; and performing blind decoding operations on PDCCH candidates and CCEs up to the per cell monitoring limit for each cell.

17. The method of claim 16, wherein the calculated total number of cells for the source cell group and the target cell group for a given SCS, is a number of cells without CORESET grouping or with one CORESET group in the source cell group and in the target cell group with the same SCS plus a multiple factor for the source cell group times a number of cells with two CORESET groups in the source cell group with the same SCS plus a multiple factor for the target cell group times a number of cells with two CORESET groups in the target cell group with the same SCS.

18. The method of claim 16, wherein the calculated total number of cells over all configured SCSs for the source cell group and the target cell group is less than or equal to the joint blind decode capability and wherein identifying the per cell limit comprises:

determining the per cell limit for each cell without CORESET grouping or with one CORESET group with a given SCS as a value equal to a lookup value of a serving cell with the same SCS; and determining the per cell limit for each cell with two CORESET groups with a given SCS as a multiple factor for the respective cell group multiplied by a lookup value of a serving cell with same SCS.

19. The method of claim 16, wherein the calculated total number of cells over all configured SCSs for the source cell group and the target cell group is greater than the joint blind decode capability and wherein identifying the per cell limit comprises:

determining a total monitoring limit for a given SCS as a function of the joint blind decode capability and a lookup value of a serving cell with the same SCS;

determining the per cell limit for each cell without CORESET grouping or with one CORESET group with a given SCS as a minimum of the total monitoring limit for the given SCS and a lookup value of a serving cell with the same SCS;

determining the per cell limit for each cell with two CORESET groups of the source cell group with a given SCS as a minimum of the total monitoring limit for the given SCS and a multiple factor for the source cell group multiplied the lookup value of a serving cell with the same SCS; and determining the per cell limit for each cell with two CORESET groups of the target cell group with a given SCS as a minimum of the total monitoring limit for the given SCS and a multiple factor for the target cell group multiplied by a lookup value of a serving cell with the same SCS.

20. The method of claim 19, wherein the function is a floor of the joint blind decode capability times a lookup value of a serving cell with the same SCS multiplied by a ratio of the calculated number of cells with the same SCS in the source cell group and target cell group to the calculated total number of cells across all configured SCSs for the source cell group and the target cell group.

21. The method of claim 16, wherein the joint blind decode capability for the source cell group and the target cell group is a capability reported by the apparatus or configured by a network.

22. A method for wireless communication at an apparatus of a user equipment (UE), comprising:

determining whether a calculated number of cells over all configured sub-carrier spacings (SCSs) of a source cell group during a dual active protocol stack handover exceeds a blind decode capability for the source cell group;

identifying, based on the first determination and a subcarrier spacing (SCS) of each cell in the source cell group, a per cell limit for
  physical downlink control channel (PDCCH) candidates to monitor, or
  non-overlapped control channel elements (CCEs) to monitor
in a slot for
  each cell without control resource set (CORESET) grouping or with one CORESET group, and
  each cell with two CORESET groups if configured for the source cell group;
determining whether a calculated number of cells for a target cell group during the dual active protocol stack handover exceeds a blind decode capability for the target cell group;
identifying, based on the second determination and a SCS of each cell in the target cell group, a per cell limit for PDCCH candidates to monitor, or
  non-overlapped CCEs to monitor
in a slot for
  each cell without CORESET grouping or with one CORESET group, and
  each cell with two CORESET groups if configured for the target cell group;
obtaining a PDCCH from at least one of the source cell group and the target cell group; and
performing blind decoding operations on PDCCH candidates and CCEs up to the per cell monitoring limit for each cell.

23. The method of claim 22, wherein the calculated number of cells for the source cell group cell group for a given SCS is a number of cells without CORESET grouping or with one CORESET group with the same SCS in the source cell group plus a multiple factor for the source cell group times a number of cells with two CORESET groups with the same SCS in the source cell group and the calculated number of cells for a given SCS for the target cell group is a number of cells without CORESET grouping or with one CORESET group with the same SCS in the target cell group plus a multiple factor for the target cell group times a number of cells with two CORESET groups with the same SCS in the target cell group.

24. The method of claim 22, wherein the calculated number of cells over configured SCSs for the source cell group is less than or equal to blind decode capability for the source cell group and wherein identifying the per cell limit for the source cell group comprises:
  determining the per cell limit for each cell without CORESET grouping or with one CORESET group with a given SCS as a value equal to a lookup value of a serving cell with the same SCS for the source cell group; and
  determining the per cell limit for each cell with two CORESET groups as a multiple factor for the source cell group multiplied by a value equal to the lookup value for a serving cell with same SCS for the source cell group.

25. The method of claim 22, wherein the calculated number of cells over all configured SCSs in the source cell group is greater than the blind decode capability for the source cell group and wherein identifying the per cell limit comprises:
  determining a source cell group monitoring limit for a given SCS as a function of the source blind decode capability and a lookup value of a serving cell with the same SCS for the source cell group;
  determining the per cell limit for each cell without CORESET grouping or with one CORESET group of the source cell group with a given SCS as a minimum of the source cell group monitoring limit for the given SCS and the lookup value of a serving cell with the same SCS; and
  determining the per cell limit for each cell with two CORESET groups of the source cell group with a given SCS as a minimum of the source cell group monitoring limit for the given SCS of the cell with two CORESET groups and a multiple factor for the source cell group multiplied the lookup value of a serving cell with the same SCS for the source group.

26. The method of claim 25, wherein the function is a floor of the blind decode capability for the source cell group times the lookup value for a serving cell with same SCS for the source group multiplied by a ratio of a calculated number of cells with the same SCS in the source cell group and the calculated number of cells over all configured SCSs in the source cell group.

27. The method of claim 25, wherein the lookup value for a serving cell with the same SCS for the source group is equal to the lookup value for a serving cell with the same SCS.

28. The method of claim 25, wherein a sum of the lookup value for a serving cell with the same SCS for the source group and a lookup value for a serving cell with the same SCS for the target group is equal to the lookup value for a serving cell with the same SCS.

29. The method of claim 22, wherein the blind decode capability for the source cell group and the blind decode capability for the target cell group are based on separate capabilities reported by the apparatus.

30. The method of claim 22, wherein the blind decode capability for the source cell group and the blind decode capability for the target cell group are configured by a network.

* * * * *